United States Patent [19]
Yamato et al.

[11] Patent Number: 6,041,062
[45] Date of Patent: Mar. 21, 2000

[54] HIGH-SPEED SYNCHRONOUS MULTIPLEXING APPARATUS

[75] Inventors: Seiichi Yamato; Noboru Kamei; Kazuyoshi Okuma; Katsumi Sugawa; Hironori Kadota; Tomoyuki Sakata, all of Fukuoka, Japan

[73] Assignee: Fujitsu Limited, Kanagawa, Japan

[21] Appl. No.: 08/874,358

[22] Filed: Jun. 13, 1997

[30]   Foreign Application Priority Data

Jun. 13, 1996 [JP] Japan ................................. 8-152080
Jun. 11, 1997 [JP] Japan ................................. 9-153961

[51] Int. Cl.[7] .......................... G01R 31/08; G06F 11/00; G08C 15/00; H04J 3/16
[52] U.S. Cl. .......................... 370/465; 370/465; 370/466; 370/467; 370/242; 370/243; 370/246
[58] Field of Search .................................... 370/466, 467, 370/375, 376, 535, 539, 541, 509, 242, 243, 246, 248, 468, 503, 505, 537, 538, 907

[56]   References Cited

U.S. PATENT DOCUMENTS 4,697,262 9/1987 Segal et al. ................................. 370/84
4,979,166 12/1990 Yamada ...................................... 370/84
5,257,261 10/1993 Parruck et al. ........................... 370/84
5,757,806 5/1998 Koyama et al. ......................... 370/535
5,857,092 1/1999 Nakamura et al. ..................... 395/500

Primary Examiner—Michael Horabik
Assistant Examiner—Man Phan
Attorney, Agent, or Firm—Helfgott & Karas, PC.

[57]   ABSTRACT

A high-speed sprchronous multiplexing apparatus has a low-speed device and a high-speed device and employs electrical signals to interface the devices with each other. The low-speed device is connected to a low-speed digital circuit. The high-speed device is connected to a high-speed synchronous multiplexing circuit. The apparatus also has a clock supplier for supplying a reference clock signal that defines a communication rate, to each of the low- and high-speed devices. The apparatus further has an alarm processor for separating faults in the low- and high-speed devices. The low- and high-speed devices are interfaced with each other with the use of the reference clock signal and electrical STM-0/STS-1 signals that employ a frame signal synchronized with the reference clock signal.

35 Claims, 28 Drawing Sheets

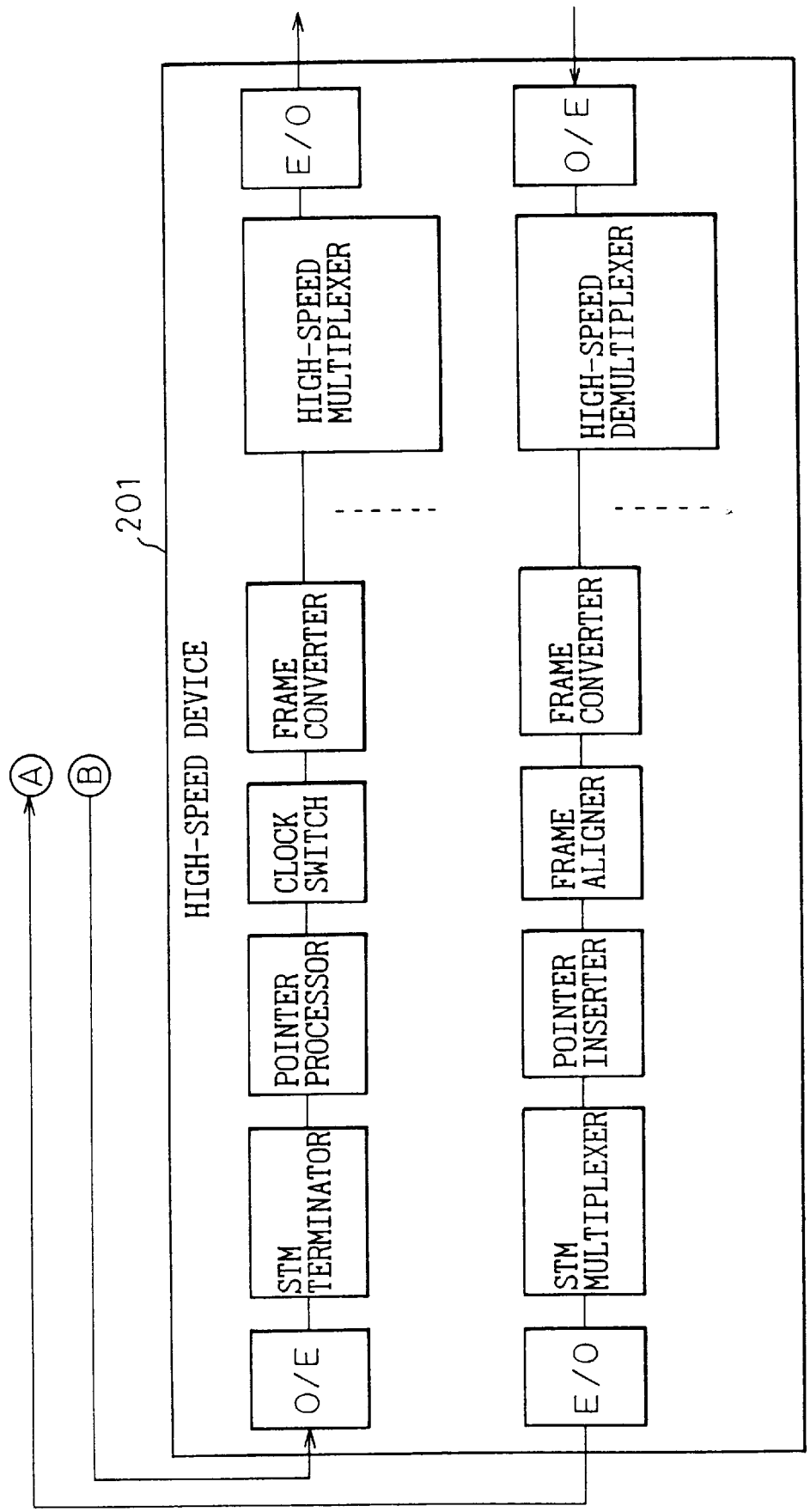

TIME CHART

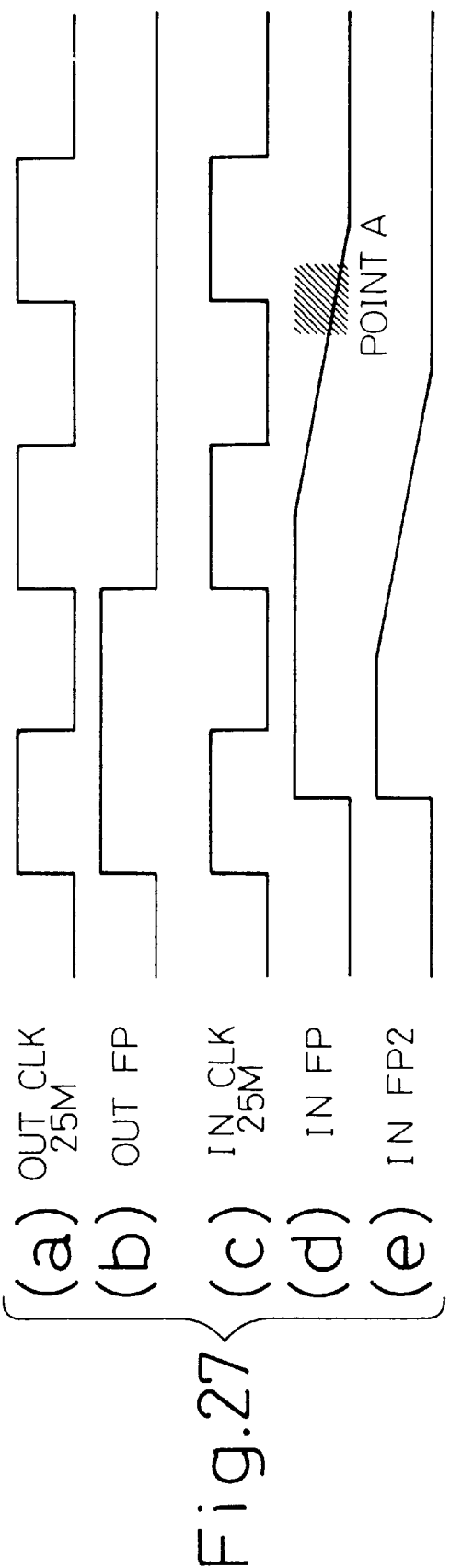

HIGH-SPEED SYNCHRONOUS MULTIPLEXING APPARATUS

BACKGROUND OF THE INVENTION

1. Field of the Invention

The present invention relates to a high-speed synchronous multiplexing apparatus, and particularly to an SDH (synchronous digital hierarchy) apparatus having a high-speed device and a low-speed device, and further, to one that employs electrical signals to interface the high- and low-speed devices with each other.

The apparatus according to the present invention is able to apply the North American Standard SONET (Synchronous Opticall Network), wherein a STM (Synchronous Transport Module) signal is changed to a STS (Synchronous Transport Signal) signal, and a VC (VIrtual Container) signal is changed to a VT (Virtual Tributary) signal.

The SDH apparatus synchronously transmits frames of information, using optical signals, at a high speed. The SDH apparatus is required to reduce the scale thereof to minimize the cost and improve the performance thereof. To achieve this, an SDH apparatus that employs electrical signals to interface internal devices with each other is needed.

2. Description of the Related Art

FIG. 1 shows an SDH apparatus according to a prior art. The apparatus has a low-speed device 200 and a high-speed device 201 and uses optical signals to interface the devices 200 and 201 with each other.

The interfacing optical signals are optical STM-0 (Synchronous Transport Module level One, which corresponds to a STS-1 in the North American Standard) signals of 51.48 Mb/s as specified in the SDH standards. The "STM" is an abbreviation of "synchronous transport module."

FIGS. 2A and 2B show examples of the low- and high-speed devices 200 and 201 of the prior art of FIG. 1.

In the low-speed device 200, an optical-to-electrical converter converts a low-speed optical input signal into an electrical signal. An STM terminator terminates the electrical signal and separates an STM frame from the electrical signal. A pointer processor sets a pointer to indicate the position of data in the signal. A clock switch switches a clock signal attached to the input signal to an internal clock signal. A frame aligner aligns the STM frame. A pointer inserter inserts a pointer into the STM frame. An STM multiplexer prepares an electrical STM signal. An electrical-to-optical converter converts the electrical STM signal into an optical STM signal, which is transferred to the high-speed device 201. An optical signal from the high-speed device 201 to the low-speed device 200 is processed in the opposite way, to provide a low-speed optical signal.

In the high-speed device 201, an optical-to-electrical converter converts the optical STM signal from the low-speed device 200 into an electrical STM signal. An STM terminator terminates the electrical STM signal and separates an STM frame from the same. A pointer processor sets a pointer to indicate the position of data in the STM frame. A clock switch switches a clock signal attached to the input signal to an internal clock signal. A frame converter converts the STM frame into an internal frame. A high-speed multiplexer multiplexes such frames into an electrical STM signal. An electrical-to-optical converter converts the electrical STM signal into an optical STM signal, which is transmitted to another station. When the high-speed device 201 receives an optical STM signal from another station, an optical-to-electrical converter converts the optical signal into an electrical signal, and a high-speed demultiplexer demultiplexes the electrical signal into STM frames. Thereafter, the above-mentioned processes are carried out in the opposite way, and an optical signal is transferred to the low-speed device 200.

In this way, each of the low- and high-speed devices 200 and 201 of the prior art receives an STM signal, terminates the same, reassembles an STM signal, and transfers it to the opposite device. An interface in each device is, for example, VC32. After terminating an STM signal, the device processes a pointer to adjust the phase of the signal. The device detects a frame according to a frame pattern in the received STM signal. Each frame from the high-speed demultiplexer in the high-speed device 201 must be converted into an internal frame, which must be aligned, a pointer must be set in the frame, an STM frame must be reassembled accordingly, the STM frame must be converted into an optical STM signal, and then, the optical STM signal must be transferred to the low-speed device 200.

FIG. 3 shows switching a clock signal to another between the low-speed device 200 and the high-speed device 201 of the prior art.

The low-speed device 200 multiplexes a frame of data into an electrical signal based on an internal clock signal, converts the electrical signal into an optical signal, and transfers the optical signal to the high-speed device 201. The high-speed device 201 converts the optical signal into an electrical signal and extracts a transmission clock signal therefrom. Based on the transmission clock signal, the high-speed device 201 synchronizes a frame contained in the electrical signal, switches the transmission clock signal to the internal clock signal, and transfers the frame to another part of the high-speed device 201.

On the other hand, the high-speed device 201 multiplexes a frame of data into an electrical signal based on the internal clock signal, converts the electrical signal into an optical signal, and transfers the optical signal to the low-speed device 200. The low-speed device 200 converts the optical signal into an electrical signal, extracts a transmission clock signal therefrom, synchronizes a frame contained in the electrical signal based on the transmission clock signal, switches the transmission clock signal to the internal clock signal, and transfers the frame to another part of the low-speed device 200.

In this way, the reception interface of the prior art employs a clock signal extracted from an optical signal.

FIG. 4 shows alarm collecting and prioritizing processes of the prior art.

An alarm collector 210 collects alarms from packages in the SDH apparatus. A prioritizing unit 211 prioritizes the alarms. An alarm converter 212 converts the alarms into alarm outputs. An alarm interface 213 provides an external alarm collecting unit with an alarm signal accordingly.

The prior art carries out these alarm processes between the alarm collector 210 and the alarm interface 213 almost entirely by the use of software.

FIG. 5 shows a technique of supplying power according to the prior art.

A device unit 220 is provided with power units 221 and 222, which are separated from packages to which the units 221 and 222 supply power. Namely, the power units 221 and 222 are independent of the packages and are collectively installed in the device unit 220.

As explained above, the SDH apparatus of the prior art employs an optical interface between the low- and high-speed devices 200 and 201. Accordingly, each of the devices 200 and 201 must have the optical-to-electrical and electrical-to-optical conversion functions, STM termination function, and frame conversion function. These functions increase the scale of each device. The problems of the prior art employing the optical interface will be explained in more detail.

STM-0 signals are transmitted between the low- and high-speed devices 200 and 201 at a rate of 51.84 Mb/s. When processing the signals in series, each device may have a shortage of timing margin. The devices, therefore, must use ECL circuits, which increase power consumption and need a large space.

Using the optical interface between the devices 200 and 201 necessitates the functions of converting optical signals into electrical signals and STM frames into internal frames. These functions are realized with circuits that need a large space. The prior art uses for various processes the frame period of an upward input signal that travels in the direction from the low-speed device 200 to the high-speed device 201, and therefore, the high-speed multiplexer of the high-speed device 201 must absorb frame phases. Accordingly, the high-speed multiplexer must have large capacity and size.

The prior art terminates an external frame and converts the frame into an internal frame. Accordingly, the prior art must have large frame converters. The prior art synchronizes an STM-0 frame by scrambling and descrambling. This needs large frame circuits. The prior art must have the frame conversion function, frame aligning function, and STM multiplexing function in each of the low- and high-speed devices 200 and 201, thereby increasing the scale of the SDH apparatus. Since the interface between the low- and high-speed devices 200 and 201 is asynchronous as shown in FIG. 3, stuffing and clock switching functions are needed which increase the circuit scale.

To set apparatus parameters, the SDH apparatus of the prior art must have a controller. This also increases the scale of the SDH apparatus in terms of software and hardware. If the low- and high-speed devices 200 and 201 are disconnected from each other, the circuit involving them is unused. Alarms in the unused circuit hinder the detection of a fault during maintenance. However, these alarms must not simply be masked, because if an erroneous disconnection occurs and if a circuit switching alarm to cope with the disconnection is masked, the disconnected circuit will be left as it is without switching to another.

The prior art employs software to process alarms and cope with faults, as shown in FIG. 4. The high-speed device 201 handles many circuits and are, therefore, unable to satisfy required performance or specified processing time if the alarm process is entirely carried out by software. On the other hand, there are many decoded alarms, which are usually not transmitted by hardware, e.g., signal lines. If alarms are prioritized only by hardware decoding, an enormous number of changes will be involved whenever a change or an error occurs in the priority of alarms.

An alarm frequently causes chain alarms during maintenance. When prioritizing these alarms along a time axis, the prior art sometimes provides a useless priority result or an intricate priority process that needs an accumulation of alarms for a given period, depending on the order and timing of collecting alarms from packages.

The prior art collectively installs power sources in a given package in the SDH apparatus, as shown in FIG. 5. This hinders a hierarchical arrangement of packages that are designated for specific functions in the SDH apparatus.

The prior art also has a problem in connection with an electrical interface between packages. When a sender package transfers a signal to a receiver package that is made of a CMOS circuit, a source voltage transitionally increases when the receiver package is inserted or extracted. This results in increasing an input voltage above a voltage allowed for a reception buffer, to cause a latch-up phenomenon to break the buffer. When the prior art employs a high-speed clock signal of 25 MHz, wiring capacitance causes a bad influence. Namely, the pulse width of a frame pulse signal widens to cover two pulses of the clock signal.

SUMMARY OF THE INVENTION

An object of the present invention is to provide an SDH apparatus that employs as many common parts as possible and a simple electrical interface, to reduce the scale and power consumption thereof.

Another object of the present invention is to provide a high-speed synchronous multiplexing apparatus having a fault detector and a clock supply unit to solve the problems of the prior art. This high-speed synchronous multiplexing apparatus is capable of controlling itself without a separate controller, processing alarms at a high speed, avoiding malfunctions, and employing divided functions.

In order to accomplish the objects, the present invention provides a high-speed synchronous multiplexing apparatus having first and second communication devices. The first communication device is connected to and involves a low-speed digital circuit. The second communication device is connected to an STM circuit.

The high-speed synchronous multiplexing apparatus is provided with a clock supplier and an alarm processor. The clock supplier provides the first and second communication devices with reference clock signals to define communication rates. The alarm processor separates faults in the first and second communication devices.

The first communication device receives data from the low-speed digital circuit, prepares serial data synchronized with the reference clock signal, and supplies the serial data and a frame signal to the second communication device. The second communication device prepares a high-speed synchronous multiplexed signal from the serial data and transmits the high-speed synchronous multiplexed signal to the high-speed synchronous multiplexing circuit.

The second communication device receives a high-speed synchronous multiplexed signal from the high-speed synchronous multiplexing circuit, prepares serial data synchronized with the reference signal from the high-speed synchronous multiplexed signal, and transfers the serial data and a frame signal to the first communication device. The first communication device prepares a data signal from the serial data and transmits the data signal to the low-speed digital circuit.

The first communication device sends fault information occured in the first communication device to the alarm processor.

The first communication device transfers, through an electrical interface, data from a low-speed terminator as it is to the second communication device. Alternatively, the first communication device converts the data into a VC (or VT) signal and transfers it to the second communication device. On the other hand, the second communication device transfers, through the electrical interface, serial data to the low-speed terminator of the first communication device. The second communication device may transmit a STM (or STS) signal from the STM circuit as it is to the first communication device. Alternatively, the second communication device converts the STM signal into a VC signal and transmits it to the first communication device. The VC signal is provided with an STM header format in which only a pointer and a fault notification byte are used.

The present invention also provides a high-speed synchronous multiplexing apparatus having a low-speed device and a high-speed device. The low-speed device converts a parallel STM-0 (or STS-1) signal and a serial STM-0 signal from one into another. The high-speed device converts a serial STM-0 signal and a high-order STM signal from one into another. The low- and high-speed devices are connected to each other through an electrical interface.

The electrical interface uses two electrical signals that are formed by dividing an STM-0 signal. An interface for STM-0 signals in the high-speed device may be an STM-0 interface.

More precisely, the STM-0 interface in the high-speed device switches the frame phase of an upward signal oriented in the direction from the low-speed device to the high-speed device to an internal frame phase. The high-speed device simply multiplexes STM-0 signals based on the internal frame phase into a high-order STM signal. The STM-0 interface detects a frame according to a frame pulse signal.

The STM-0 interface in the high-speed device detects disconnection and an error in a downward signal oriented in the direction from the high-speed device to the low-speed device and transfers the downward signal to the low-speed device. The low-speed device synchronizes the signal based on a frame pulse signal transferred from the high-speed device.

The high- and low-speed devices operate on a clock signal supplied by the clock supplier.

Each package in the high-speed synchronous multiplexing apparatus is provided with a switch to change internal parameters.

A connector for connecting devices to each other in the SDH apparatus is provided with installation information to indicate whether or not the connector is installed. The information is used to mask alarms from the device in which the connector is not installed with respect to other devices.

A circuit switching trigger is excluded from such masking.

The high-speed synchronous multiplexing apparatus of the present invention collects alarms in spreading order, encodes them, decodes a string of alarm codes, and detects an alarm of highest priority. The present invention realizes these alarm processes by hardware including a decoder.

A result of the prioritizing of the alarms is sent as serial data to the alarm processor through registers. The prioritizing of the alarms is realized by decoding operation carried out with the use of mapping information stored in a ROM. Alarms are collected from respective parts of the high-speed synchronous multiplexing apparatus from those having low priority up to those having high priority.

The present invention provides each package in the high-speed synchronous multiplexing apparatus with a power source.

The present invention employs installation information that indicates whether or not a package is installed in the high-speed synchronous multiplexing apparatus. This information is used to delay a rise of an input voltage supplied from a preceding package.

The present invention makes the pulse width of a frame pulse signal used for synchronizing an input signal narrower than the pulse width of a clock signal attached to the input signal.

BRIEF DESCRIPTION OF THE DRAWINGS

The present invention will be more clearly understood from the description of the preferred embodiments as set forth below with reference to the accompanying drawings, wherein:

FIGS. 2A and 2B show examples of low- and high-speed devices of the prior art;

FIG. 27 shows an embodiment (10) of the present invention;

DESCRIPTION OF THE PREFERRED EMBODIMENTS

Figure 6:
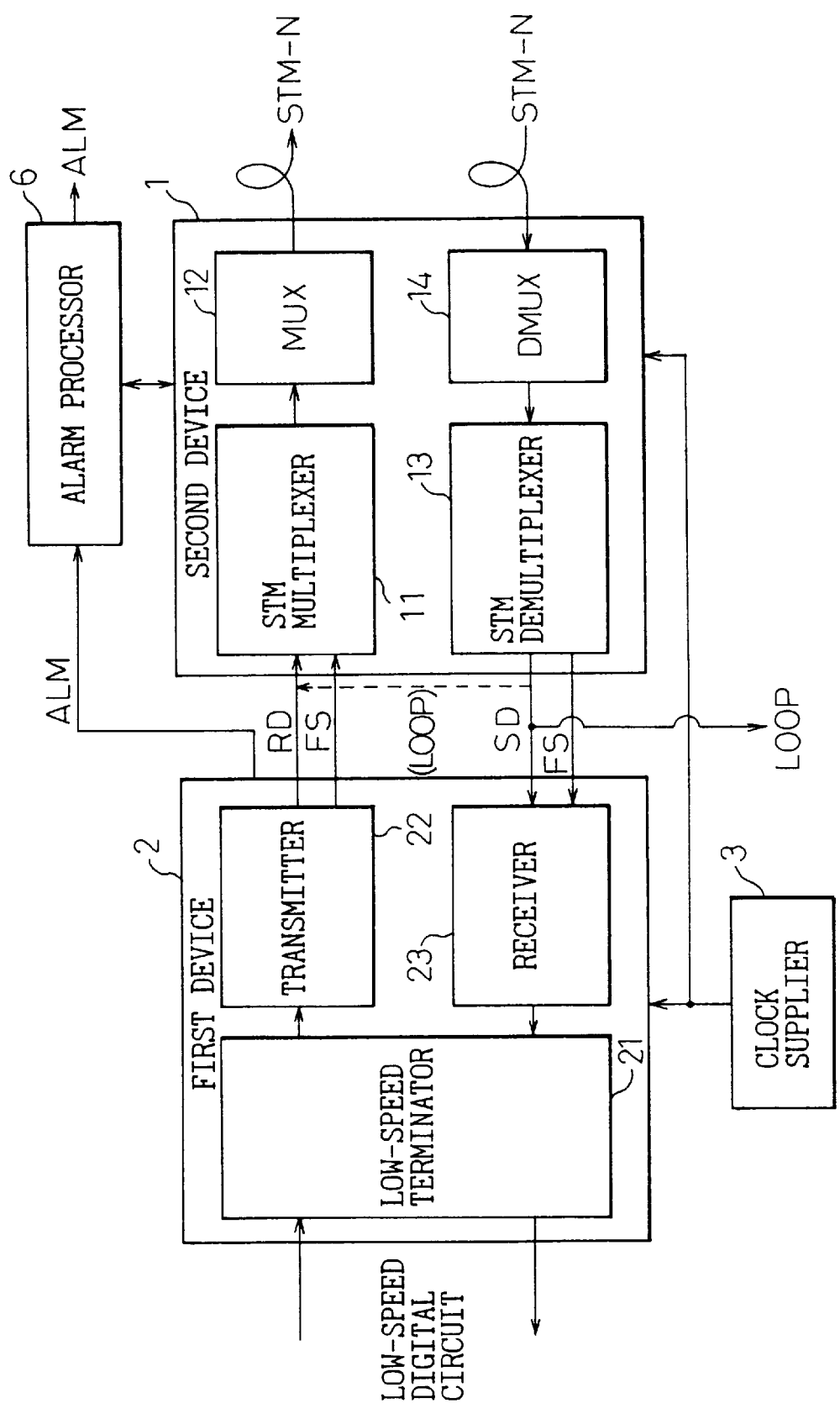
FIG. 6 shows the basic structure of a high-speed synchronous multiplexing apparatus according to the present invention.

FIG. 6 shows the basic structure of a high-speed synchronous multiplexing apparatus according to the present invention.

The SDH apparatus as a high-speed synchronous multiplexing apparatus has a first communication device 2 and a second communication device 1. The device 2 connects to and incorporates a low-speed digital circuit. The device 1 connects to an STM circuit. A clock supplier 3 supplies a reference clock signal that defines a communication rate to each of the devices 1 and 2. An alarm processor 6 separates faults occurring in the devices 1 and 2.

The first communication device 2 receives data from the low-speed digital circuit, prepares serial data from the received data in synchronization with the reference clock signal, and sends the serial data and a frame signal to the second communication device 1. The device 1 prepares an STM signal from the received data and sends it to the STM circuit. The device 1 receives an STM signal from the STM circuit, prepares serial data from the STM signal in synchronization with the reference clock signal, and sends the serial data and a frame signal to the device 2. The device 2 sends the received data to the low-speed digital circuit. The device 2 sends fault information to the alarm processor 6.

In the first communication device 2, a low-speed terminator 21 terminates the low-speed digital circuit. A transmitter 22 receives data from the terminator 21, assembles serial data from the received data, and transmits the serial data to the second communication device 1. A receiver 23 receives serial data from the device 1 and provides the terminator 21 with data to be transmitted to the low-speed digital circuit.

The transmitter 22 may transmit the data from the terminator 21 as it is as serial data, or may convert the data into a VC (virtual container) signal. The VC signal is provided with an STM header format in which only a pointer and a fault notification byte are used. The fault notification byte is used to notify the alarm processor 6 of a fault.

The receiver 23 may provide the terminator 21 with serial data from the second communication device 1 as it is. Alternatively, the receiver 23 receives a VC signal from the device 1, decomposes the VC signal into a data signal, and provides the terminator 21 with the data signal. In this case, the VC signal has an STM header format in which only a pointer and a fault notification byte are used. Instead, the receiver 23 receives an STM signal from the device 1, decompose the STM signal into a data signal, and provide the terminator 21 with the data signal.

In the second communication device 1, an STM multiplexer 11 multiplexes the serial data from the first communication device 2 into an STM signal. A high-speed multiplexer 12 multiplexes such STM signals into a multiplexed STM signal. A high-speed demultiplexer 14 receives a multiplexed STM signal from the STM circuit and demultiplexes the same into STM signals. An STM demultiplexer 13 passes a corresponding one of the STM signals to the device 2, or demultiplexes the STM signal into serial data and transmits the serial data to the device 2.

The STM multiplexer 11 receives serial data or a VC signal from the first communication device 2 and multiplexes it into an STM signal. The VC signal has an STM header format involving a pointer and a fault notification byte that is transferred to the alarm processor 6.

The STM demultiplexer 13 provides the first communication device 2 with serial data or a VC signal. The VC signal has an STM header format involving a pointer and a fault notification byte. Alternatively, the STM demultiplexer 13 may pass a received STM signal as it is to the device 2.

Figure 7:
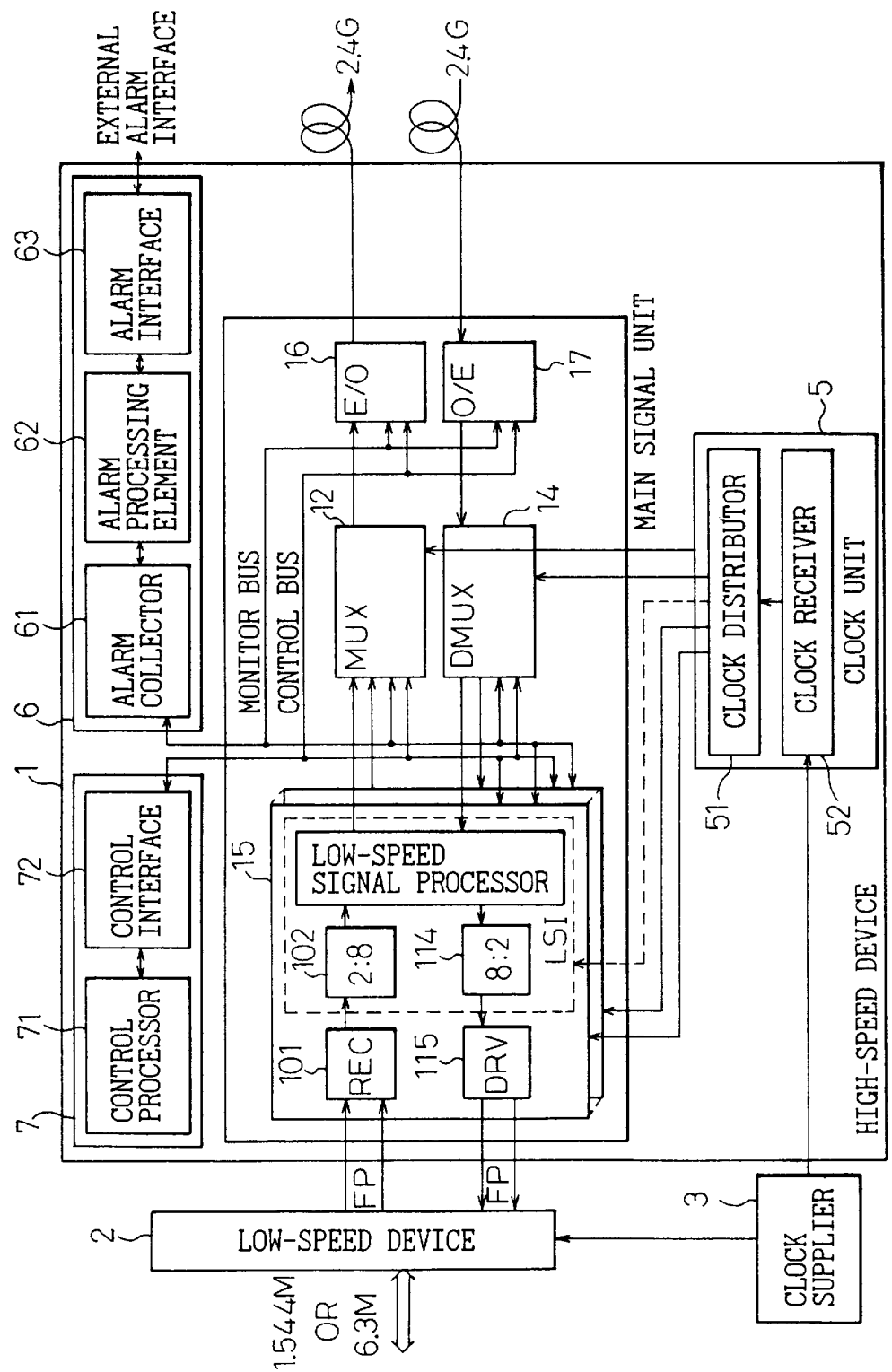
FIG. 7 shows a general arrangement of devices of the high-speed synchronous multiplexing apparatus of FIG. 6.

FIG. 7 shows a general arrangement of devices of the SDH apparatus of FIG. 6. In the following explanation, the first communication device 2 is called the low-speed device 2, and the second communication device 1 is called the high-speed device 1. In FIG. 7, the same parts as those of FIG. 6 are represented with like reference marks.

The low-speed device 2 terminates a first-order digital circuit of 1.544 Mb/s or a second-order digital circuit of 6.3 Mb/s. The low-speed device 2 provides the high-speed device 1 with received data as it is, or a VC signal containing a plurality of pieces of received data.

In the high-speed device 1, each electrical interface 15 receives a signal from the low-speed device 2 and multiplexes it into an STM (synchronous transfer module) signal. The high-speed multiplexer 12 simply multiplexes such STM signals from the electrical interfaces 15 into a multiplexed STM signal. An electrical-to-optical converter 16 converts the multiplexed STM signal into a multiplexed optical STM signal, e.g., an STM-16 signal of 2.4 Gb/s.

The high-speed device 1 receives a high-speed multiplexed optical STM signal, e.g., an STM-16 signal of 2.4 Gb/s. An optical-to-electrical converter 17 converts the optical signal into an electrical signal. The high-speed demultiplexer 14 demultiplexes the electrical signal into STM signals, which are transferred to the electrical interfaces 15. Each of the electrical interfaces 15 demultiplexes the received STM signal into a data signal for the first-order digital circuit or for the second-order digital circuit, or into a VC signal. The demultiplexed signal is transferred to the low-speed device 2.

In this way, the low-speed device 2 and the high-speed device 1 communicate low-speed data signals or VC signals between them. On the other hand, the prior art communicates STM signals between the high- and low-speed devices, and therefore, must terminate, multiplex, and demultiplex the STM signals in each of the low- and high-speed devices. Unlike the prior art, the high-speed device 1 of the present invention collectively carries out these processes, to simplify the structure thereof.

In addition, the present invention needs no circuits for extracting bytes A1 and A2 out of an STM section overhead (SOH) to establish frame synchronization and bit synchronization between the high- and low-speed devices 1 and 2, nor circuits for scrambling and descrambling. Instead, the present invention employs the clock supplier 3 to provide the low- and high-speed devices 2 and 1 each with a reference clock signal. To synchronize a frame, any one of the devices 1 and 2 that serves as a transmitter sends a frame pulse signal to the other that serves as a receiver. A clock unit 5 generates various clock signals used by packages contained in the high-speed device 1, according to the reference clock signal provided by the clock supplier 3.

The alarm processor 6 separates faults in the low- and high-speed devices 2 and 1, to cope with the problem that some pieces of fault information contained in an STM section overhead are unaccessible if a fault occurs. The alarm processor 6 receives a fault separation signal directly from the low-speed device 2. Alternatively, a simple error check signal (a parity check byte BIP-8 in FIG. 10) may be added to a VC signal provided by the low-speed device 2.

The alarm processor 6 detects an error in the low-speed device 2 according to the error check signal. At the same time, the alarm processor 6 handles a fault in any package in the high-speed device 1. A controller 7 sends and receives commands and responses to and from the packages in the high-speed device 1, to control the start, restoration, polling test, etc., of the high-speed device 1.

In this way, the present invention employs the reference clock signals (synchronous clock signals) and frame pulse signals for communication between the low- and high-speed devices 2 and 1. Accordingly, the present invention complies with conventional serial electrical interfaces involving data, clock, and frame pulse signals. Since the present invention employs electrical signals instead of optical signals between the low- and high-speed devices 2 and 1, a pair of optical-to-electrical and electrical-to-optical converters in the devices 1 and 2 are not necessary, thereby simplifying the SDH apparatus and decreasing the cost thereof.

FIGS. 8 to 11 show detailed examples of the parts of the SDH apparatus of FIG. 7.

Figure 8:
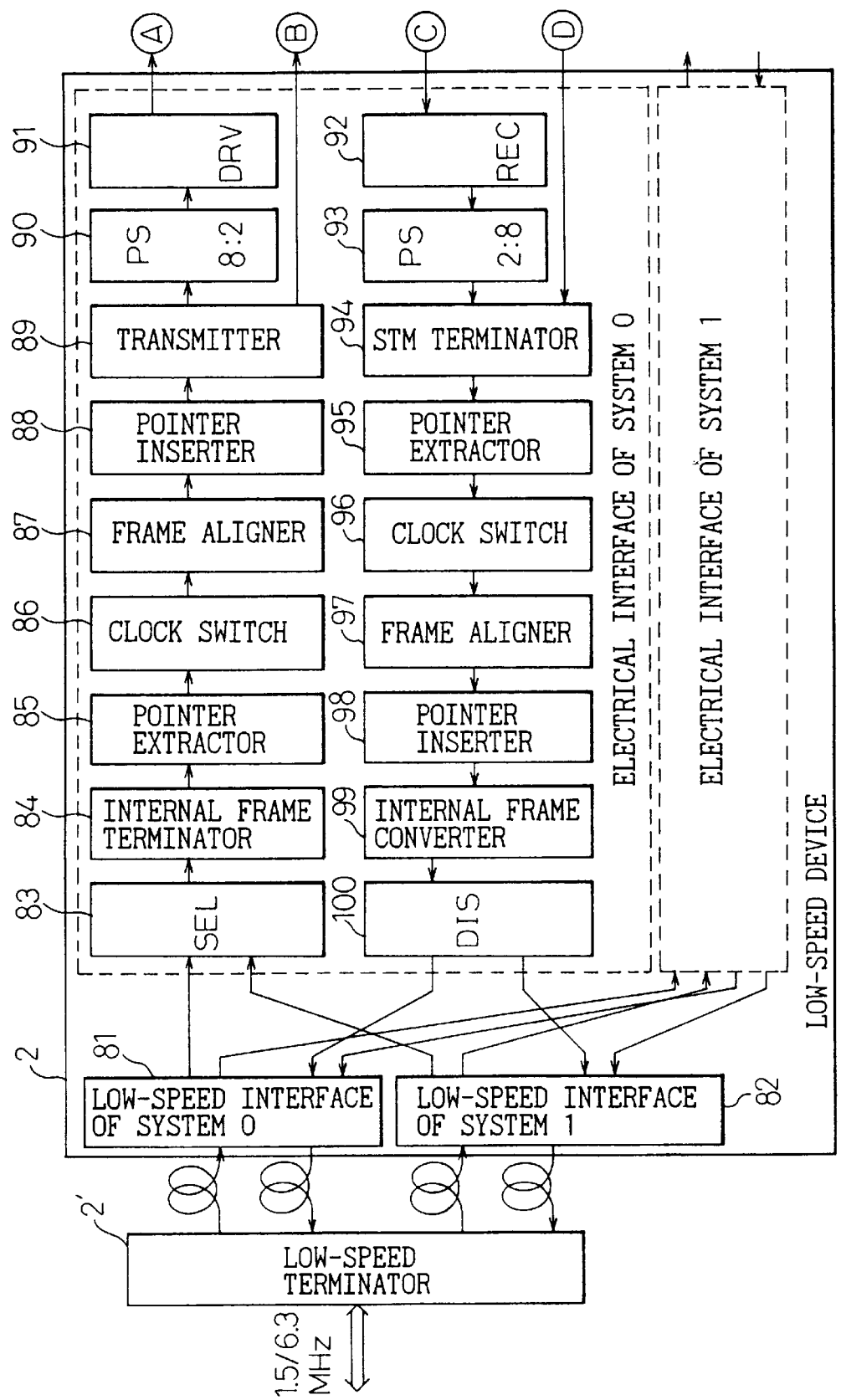
FIG. 8 shows an example of a low-speed device of the SDH apparatus of FIG. 7.
Figure 9:
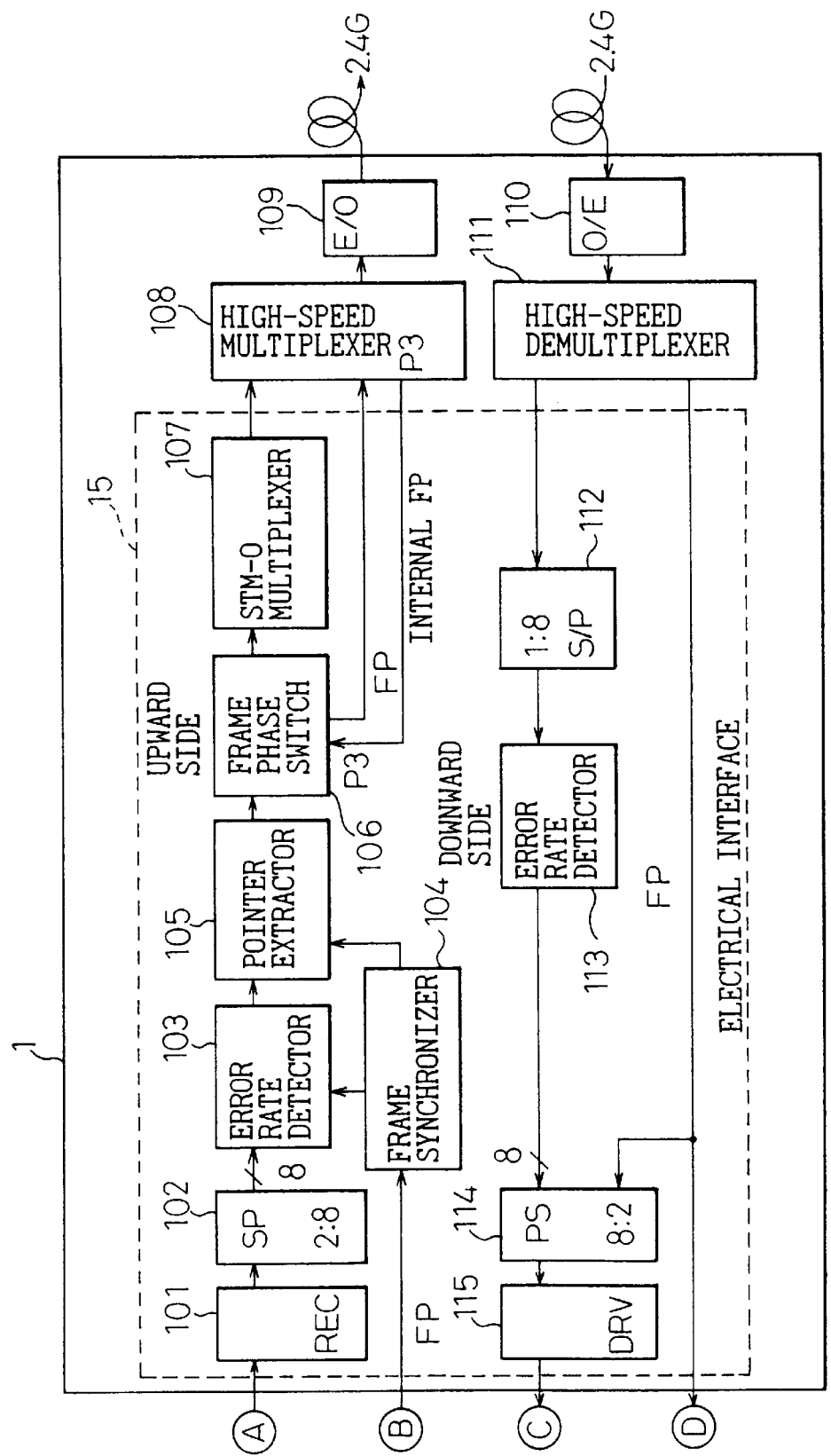
FIG. 9 shows an example of a high-speed device of the SDH apparatus of FIG. 7.
Figure 10:
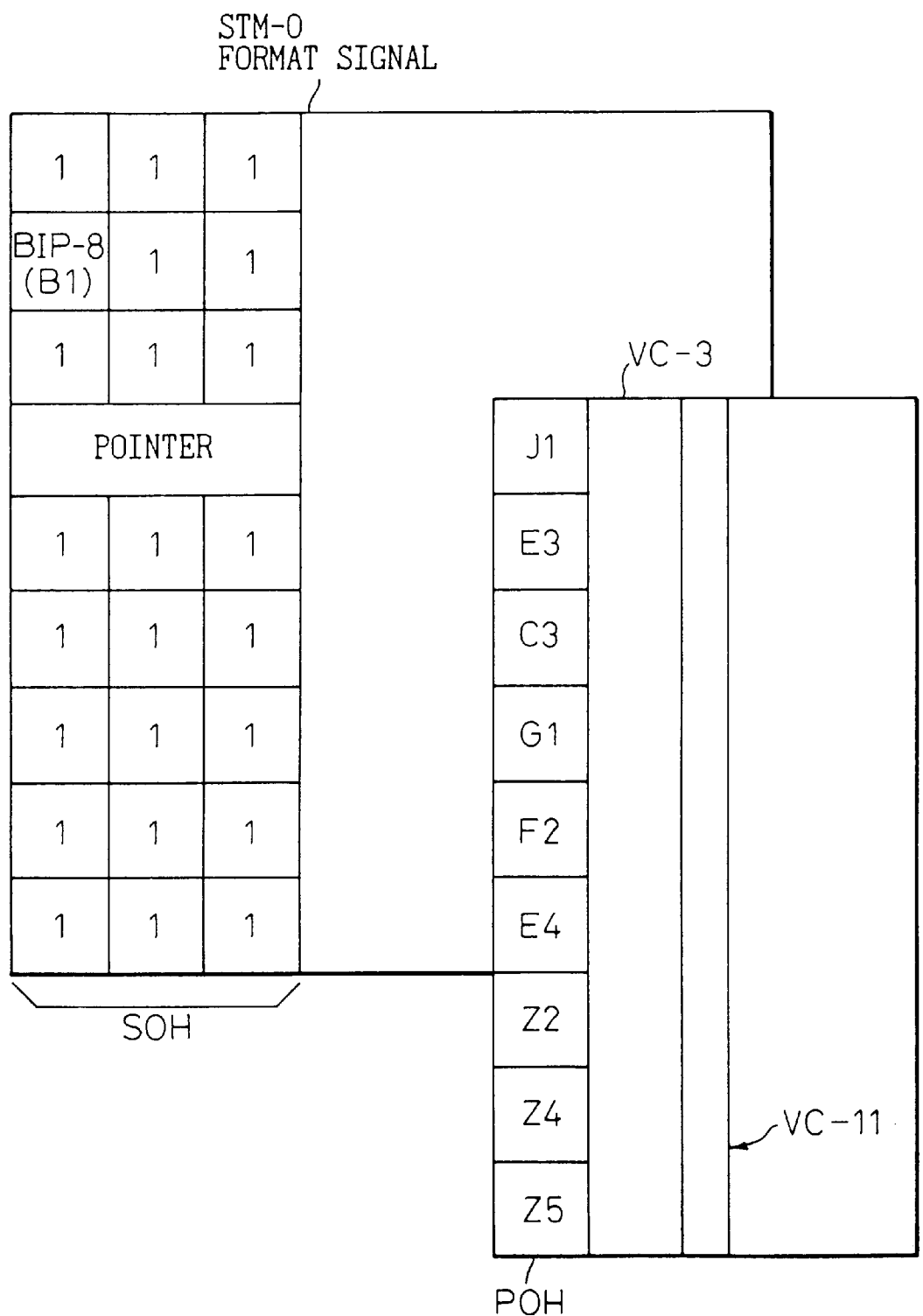
FIG. 10 shows an STM-0 format according to the present invention.
Figure 11:
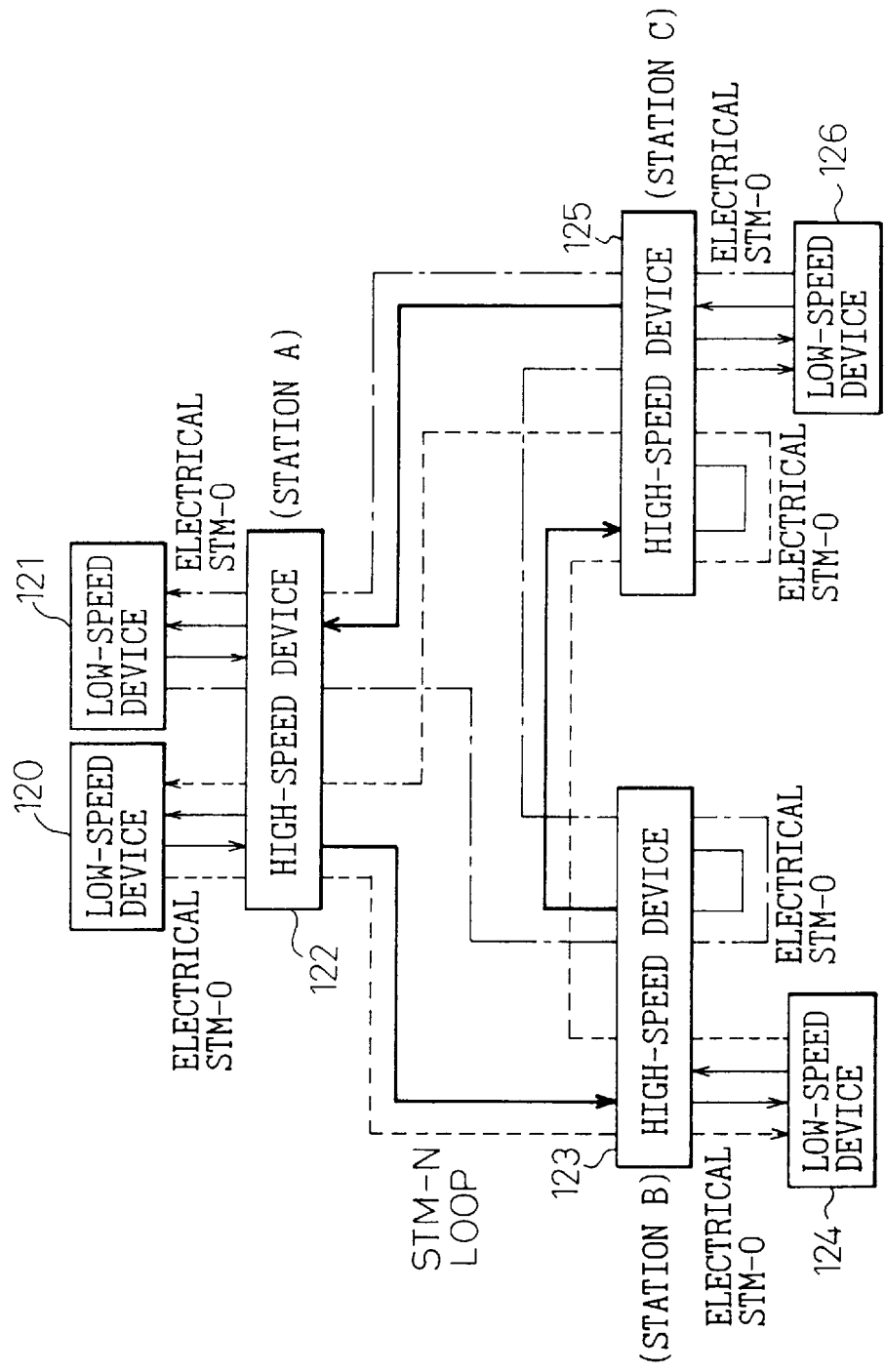
FIG. 11 shows a loop of high-speed synchronous multiplexing apparatuses according to the present invention.

FIG. 8 shows a detailed example of the low-speed device 2, and FIG. 9 shows a detailed example of the high-speed device 1. These examples employ VC signals between the low- and high-speed devices 2 and 1, and FIG. 10 shows an example of the VC signal. FIG. 11 shows a loop system involving SDH apparatuses according to the present invention.

In FIG. 8, a low-speed terminator 2' terminates, in an upward direction, a conventional first-order or second-order digital signal, multiplexes it into an optical signal such as an STM-0 of 51.84 Mb/s or an STM-1 of 155.52 Mb/s, and transfers the optical STM signal to the low-speed device 2. Broadly, the low-speed device 2 includes the low-speed terminator 2'. A selector 83 selects a usual system 0 or a spare system 1 and sends the selected optical STM signal to an internal frame terminator 84. The frame terminator 84 terminates the optical STM signal. A pointer extractor 85 extracts a pointer out of the terminated signal.

A clock switch 86 buffers a received signal, to switch a clock signal attached to the received signal to an internal clock signal and adjust the speed of the signal by, for example, stuffing. A frame aligner 87 converts the received signal into a VC-3 signal. A pointer inserter 88 adds an STM-0 header to the VC-3 signal and sets a pointer to indicate the start address of the VC-3 signal in a pointer portion of the STM-0 header. A transmitter 89 sets a parity error value (BIP-8) for an entire transmission frame to a byte B1 in the STM-0 header.

FIG. 10 shows an example of the STM-0 format.

The present invention employs the STM-0 format when transmitting VC signals, to 1) secure a reference transmission rate and 2) transmit a fault separation signal between the low- and high-speed devices 2 and 1. As a result, the present invention complies with existing SDH apparatuses. As shown in FIG. 10, the remaining header bytes other than the pointer and BIP-8 are each "1" to indicate that they are unused. The STM-0 format is only an example, and the VC signal may be transmitted in any other format.

A parallel-to-serial converter 90 and a driver 91 convert an internal 8-bit parallel signal provided by the transmitter 89 into a serial electrical signal, add a frame pulse signal and a transmission clock signal to the serial signal, and transmit them to the high-speed device 1.

The receiver side, i.e., the downward side of the low-speed device 2 receives a serial electrical signal, a frame pulse signal, and a reception clock signal from the high-speed apparatus 1. A receiver 92 and a serial-to-parallel converter 93 convert the serial signal into a parallel signal, which is terminated by an STM terminator 94. In this way, this embodiment arranges the STM terminator 94 in the low-speed device 2. This is to use STM signals to realize a loop connection of SDH apparatuses. This will be explained, later, in detail and with reference to FIG. 11.

Figure 1:
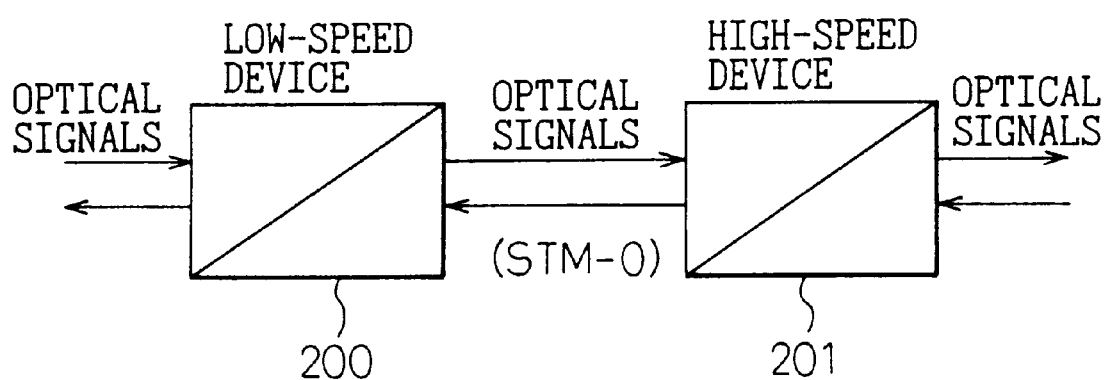
FIG. 1 shows an SDH apparatus according to a prior art employing an optical interface between devices installed therein.
Figure 2A:
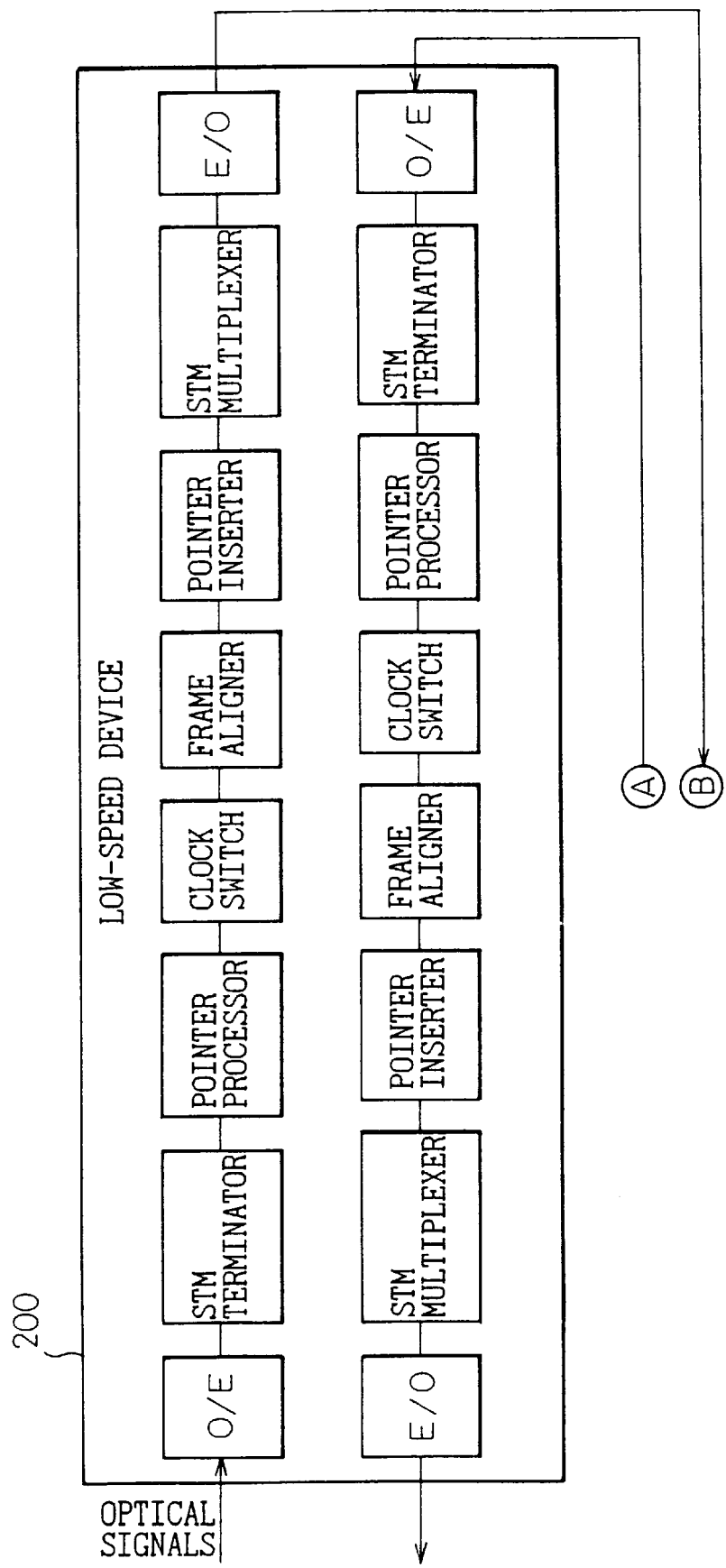
Figure 3:
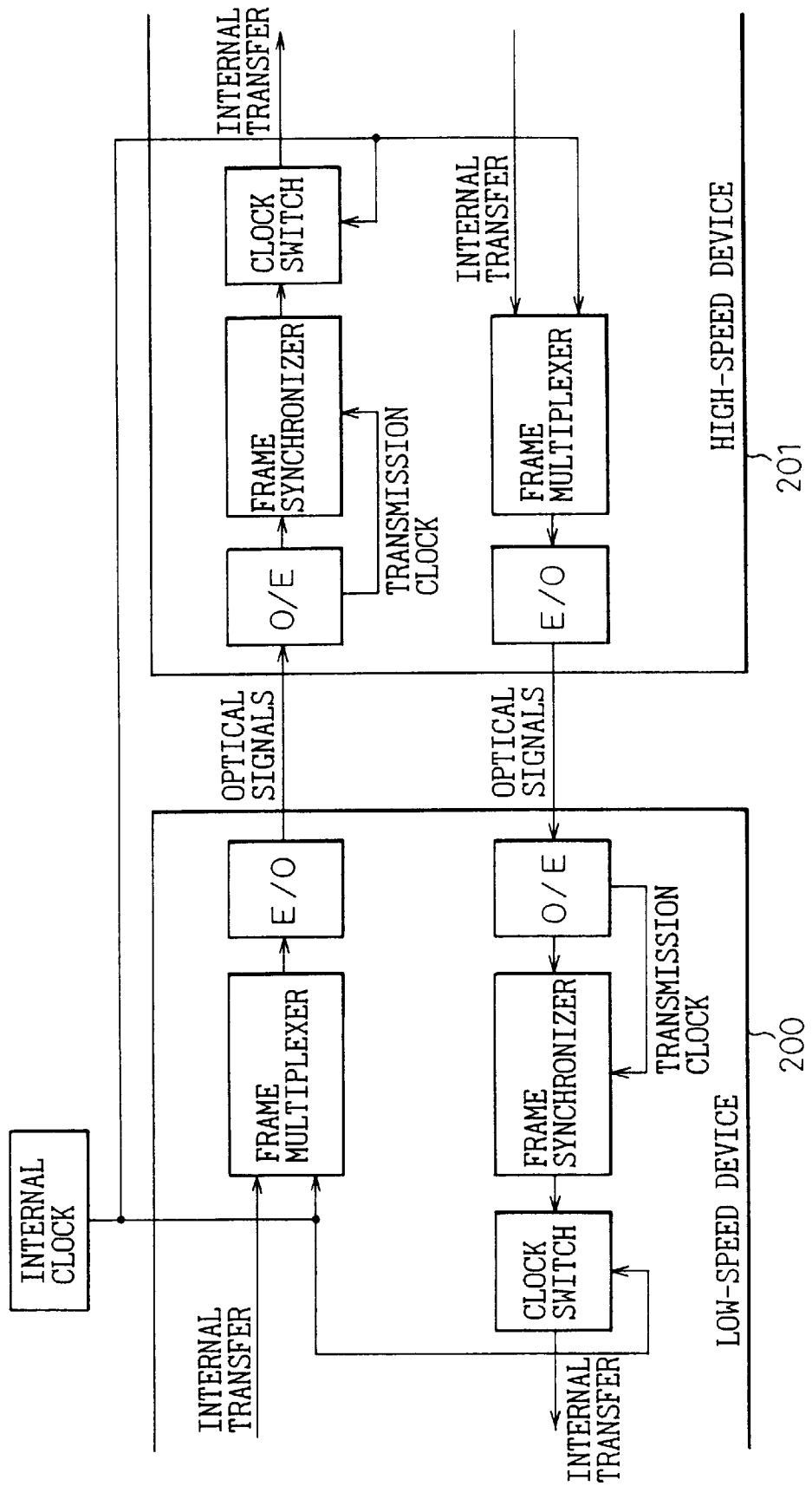
FIG. 3 shows switching a clock signal to another between the low- and high-speed devices of the prior art.
Figure 4:
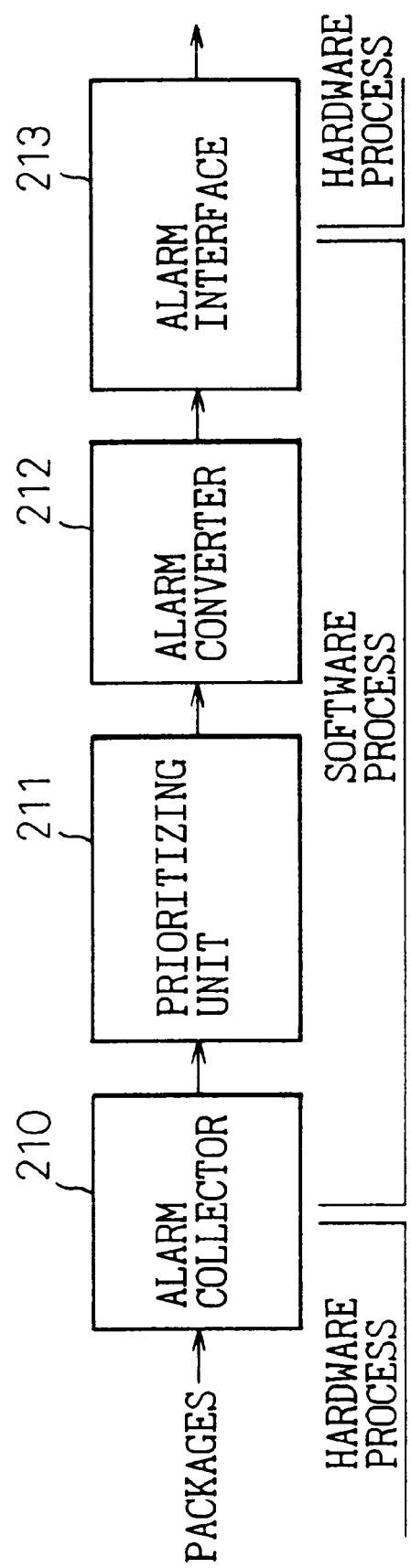
FIG. 4 shows alarm collecting and prioritizing processes of the prior art.
Figure 5:
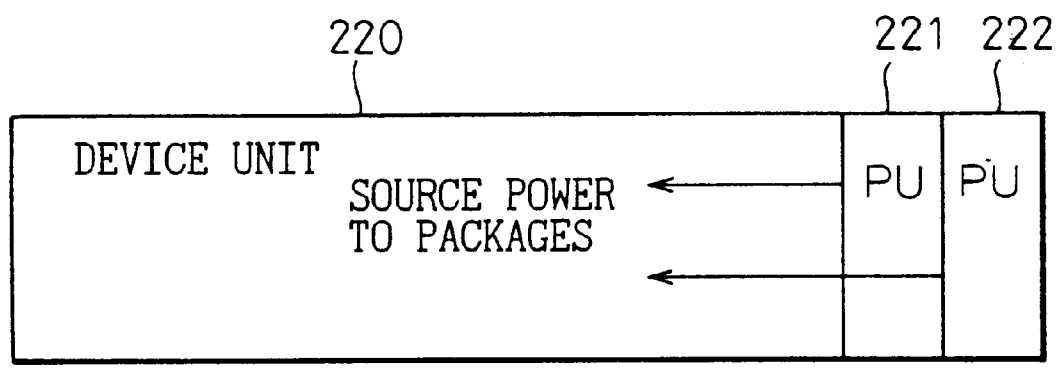
FIG. 5 shows a technique of supplying source power according to the prior art.

Consequently, the embodiment needs no STM terminators on the downward side of the high-speed device 1. It is possible to arrange an STM terminator on the downward side of the high-speed device 1 and a receiver on the downstream side of the low-speed device 2, so that the receiver may receive VC signals and decompose them. The processes following the STM terminator 94 on the downward side of the low-speed device 2 are the same as those of the prior art of FIG. 2, and therefore, are not explained again.

The circuits 90 to 93 for receiving and transmitting electrical signals will be explained in detail later. If the low-speed device 2 directly terminates a first-order digital signal of 1.544 Mb/s or a second-order digital signal of 6.3 Mb/s without multiplexing the signal into an optical STM signal, parts 2', 81 to 85, and 98 to 100 are not necessary.

The high-speed device 1 of FIG. 9 will be explained. Signals transmitted from the high-speed device 1 to the low-speed device 2 are STM signals.

A receiver 101 receives a serial electrical signal from the low-speed device 1, and a serial-to-parallel converter 102 converts the signal into an 8-bit parallel signal. A frame synchronizer 104 detects a frame pulse signal transmitted from the low-speed device 2. An error rate detector 103 carries out a parity check on each frame contained in the received signal according to the detected frame pulse signal, and compares a result with an error check byte in the STM-0 format, thereby detecting an error rate.

A pointer extractor 105 extracts a pointer from the header of the STM-0 format. An internal frame phase switch 106 determines a pointer value according to the extracted pointer and a phase difference between the detected frame pulse signal and an internal frame pulse signal and changes the frame in the received signal to an internal frame. An STM-0 multiplexer 107 multiplexes the received signal into an STM-0 signal according to the internal phase.

A high-speed multiplexer 108 simply multiplexes such STM-0 signals from the electrical interfaces 15 into a high-speed multiplexed STM signal according to the internal frame pulse signal. An electrical-to-optical converter 109 converts the signal into a high-speed optical signal (STM-16 of 2.4 Gb/s in this embodiment), which is transmitted to the STM circuit.

On the downward side of the high-speed device 1, an optical-to-electrical converter 110 converts a high-speed multiplexed optical signal (STM-16 of 2.4 Gb/s in this embodiment) into an electrical signal. A high-speed demultiplexer 111 terminates the electrical signal and demultiplexes the same into STM-0 signals. A serial-to-parallel converter 112 converts a corresponding STM-0 signal into an 8-bit parallel signal, which is supplied to an error rate detector 113. The error rate detector 113 determines whether or not the signal is present and detects an error rate. The STM-0 signal is then passed through a parallel-to-serial converter 114 and a driver 115 to add a transmission clock signal and a frame pulse signal to the serial signal. Then, they are transferred to the low-speed device 2.

FIG. 11 shows a loop of SDH apparatuses according to the present invention. Each of the SDH apparatuses has the low- and high-speed devices of FIGS. 8 and 9. A thick line indicates a trunk loop of STM-N among the high-speed devices. To directly connect the low-speed device 120 to the low-speed device 124 through a loop, and to directly connect the low-speed device 121 to the low-speed device 126 through a loop, two high-speed devices 122 will be necessary for the loops. The present invention realizes the loop for the devices 120 and 124 through a folded connection of STM-0 in the high-speed device 125 as indicated with a dotted line. Also, the present invention realizes the loop for the devices 121 and 126 through a folded connection of STM-0 in the high-speed device 123 as indicated with a dot-and-dash line.

Figure 12:
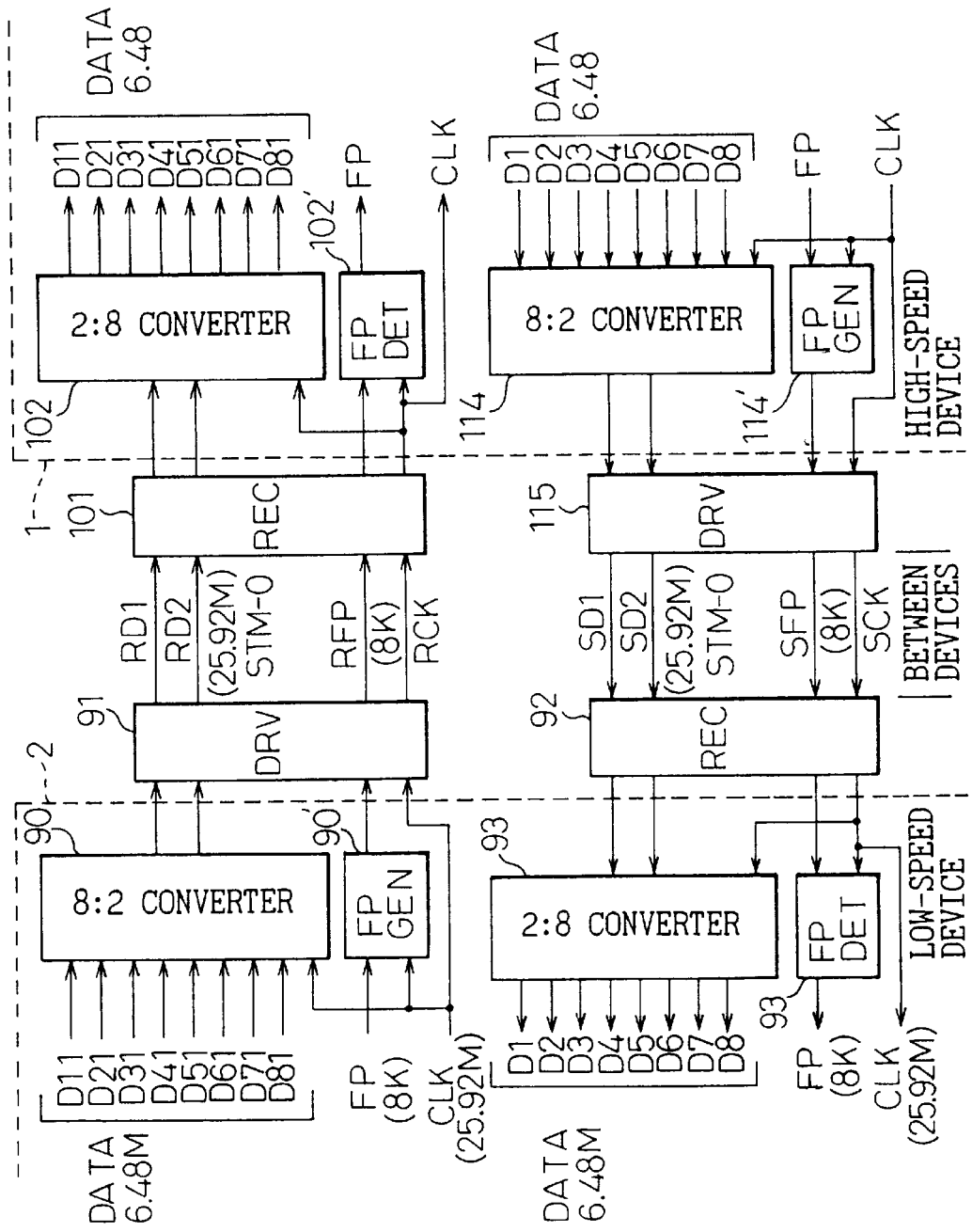
FIG. 12 shows an embodiment (1) of the present invention.
Figure 13:
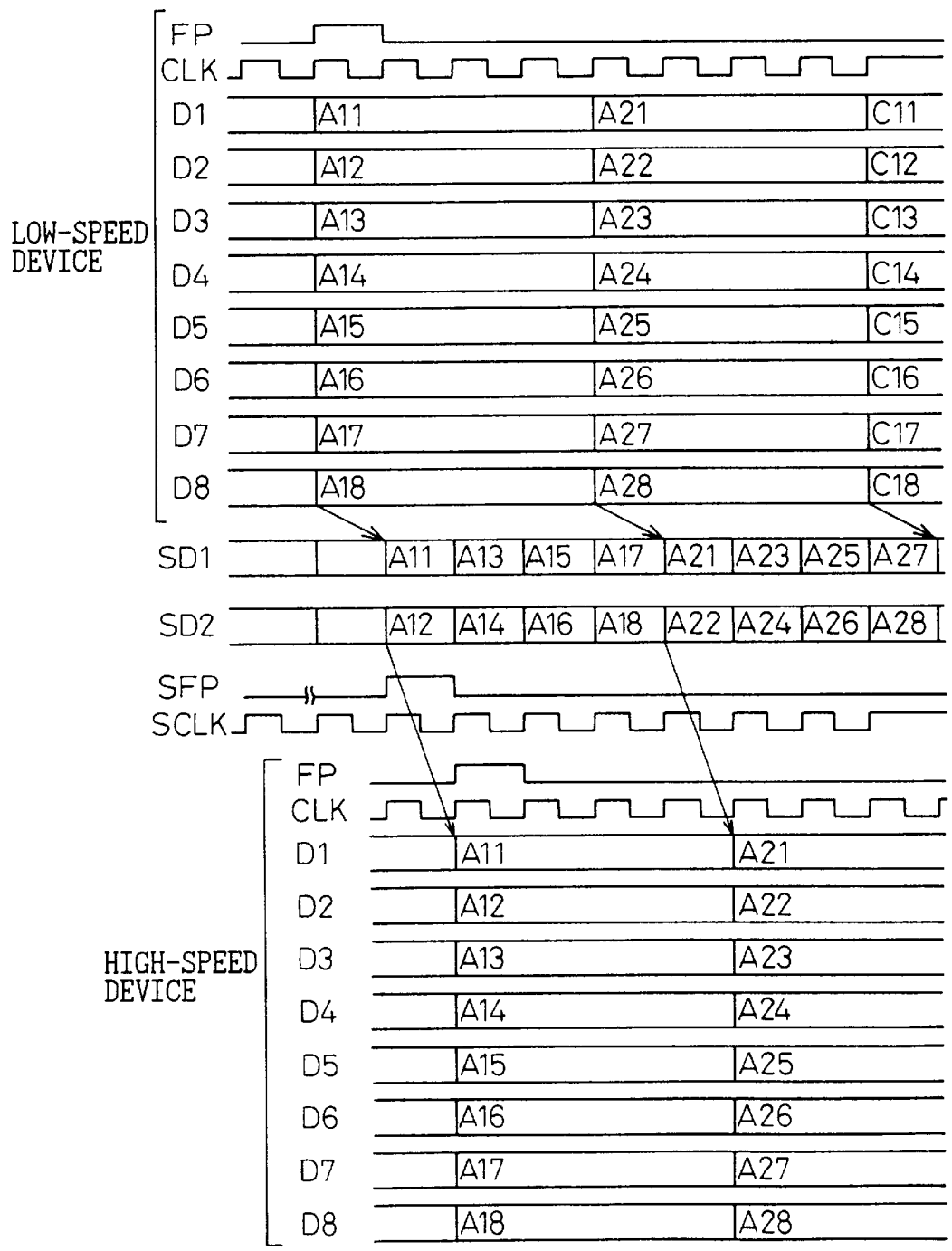
FIG. 13 is a time chart showing the operation of the embodiment (1)

FIG. 12 shows the details of electrical communication interfaces between the low- and high-speed devices 2 and 1 of FIGS. 8 and 9, according to the embodiment (1) of the present invention. FIG. 13 is a time chart showing the operation of the embodiment (1).

The operation of a downward link will be explained. The operation of an upward link can be understood therefrom. In FIG. 12, the high-speed device 1 has an 8:2 converter 114, which converts parallel data D1 to D8 of an STM-0 signal (6.48 M×8 bits=51.84 Mb/s) into two serial signals (25.92 Mb/s×2). In response to the two serial signals, a driver 115 provides two electrical signals SD1 and SD2. A frame pulse generator 114' generates a device-to-device frame pulse signal SFP from an 8-KHz frame pulse signal FP. The signal SFP is in synchronization with a transmission clock signal SCK of 25.92 MHz. A driver 115 transmits the transmission clock signal SCK (25.92 MHz) and device-to-device frame pulses signal SFP (8 KHz) to the low-speed device 2.

A receiver 92 of the low-speed device 2 receives the signals SD1 and SD2 (25.92 Mb/s×2). A 2:8 converter 93 converts the signals SD1 and SD2 into an STM-0 signal consisting of 8-bit parallel data D1 to D8 (6.48 M×8 bits). A frame pulse detector 93' detects the device-to-device frame pulse signal SFP and, accordingly, generates an internal frame pulse signal FP in synchronization with the transmission clock signal SCK. The transmission clock signal SCK is provided, as it is, as an internal clock signal CLK.

FIG. 13 shows the operations of the 8:2 converter 114 and 2:8 converter 93. The 8:2 converter 114 of the high-speed device 1 starts parallel-to-serial conversion in synchronization with a transmission clock signal SCLK in response to a pulse in the frame pulse signal SFP. This pulse indicates the start of an STM-0 frame. Using this pulse to synchronously detect a frame eliminates the need for detecting a frame pattern signal such as bytes A1 and A2 of an STM signal header, to thereby prevent false synchronization. Among the parallel eight bits, odd bits are converted into the serial signal SD1 and even bits into the serial signal SD2. The 2:8 converter 93 of the low-speed device 2 operates oppositely to the 8:2 converter 114, to carry out serial-to-parallel conversion to restore the original 8-bit parallel signal.

As shown in FIG. 12, the present invention employs electrical signals instead of optical signals. The present invention may transmit received data as it is like the prior art, or as VC signals. When transmitting the VC signals, the present invention employs the simple STM-0 format of FIG. 10, to easily interface with the inside parts of an existing SDH apparatus. The present invention employs a synchronous clock signal and a frame pulse signal between devices, to eliminate the need for scrambling and descrambling circuits that are needed for optical communication. This results in reducing the size of the SDH apparatus and prevents false synchronization.

This embodiment employs two signal lines for transmitting and receiving STM-0 signals (51.84 Mb/s), to extend a transmission distance for electric communication and secure the quality of communication. Each signal line bears a communication rate of 25.92 MHz that is half of that of the STM-0. As a result, the present invention is able to employ low-power-consumption circuits such as CMOS circuits for driver, receiver, and transmitter circuits. This helps to realize high integration.

Figure 14A:
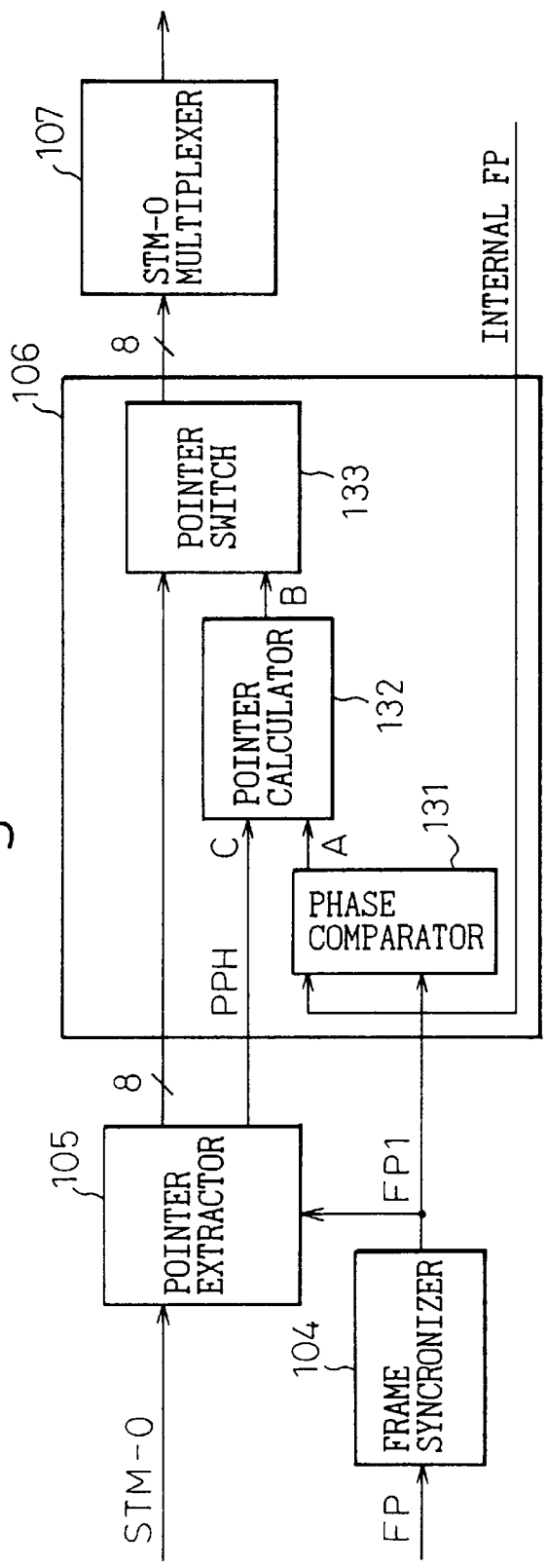
FIGS. 14A and 14B show an embodiment (2) of the present invention.
Figure 14B:
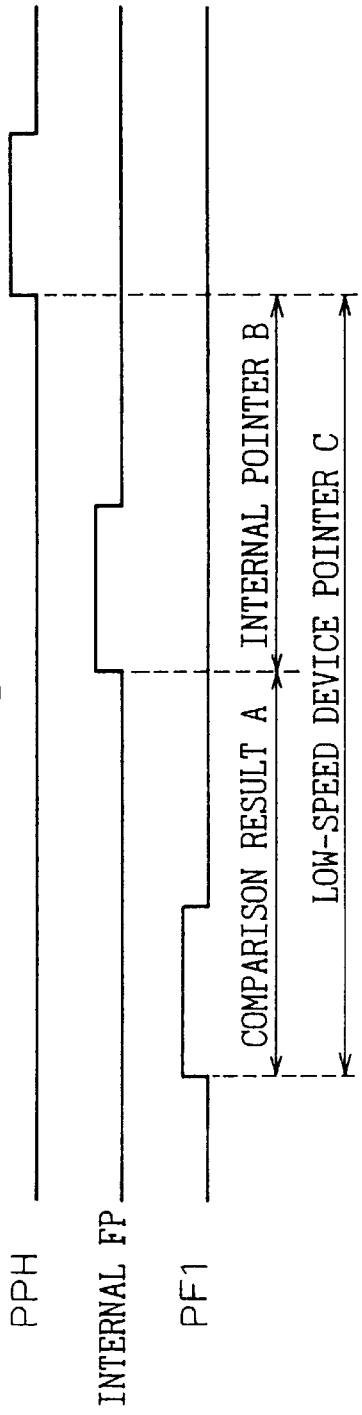

FIGS. 14A and 14B show the details of the internal frame phase switch 106 of FIG. 9 according to the embodiment (2) of the present invention.

In the figures, FIG. 14A shows the structure of the internal frame phase switch 106, and FIG. 14B shows a way of calculating an internal pointer. The same parts as those of FIG. 9 are represented with like reference marks.

The frame synchronizer 104 provides a phase FP1 of a frame pulse signal FP transferred from the low-speed device 2. A phase comparator 131 of the switch 106 compares the phase FP1 with the phase of an internal frame pulse signal FP and provides a difference A. A pointer calculator 132 subtracts the difference A from the phase of a low-speed device pointer C, to provide an internal pointer B. With the use of the pointer B, a pointer switch 133 switches the frame phase of an input signal. This results in greatly reducing a delay in data transmission in the high-speed device 1.

Figure 15:
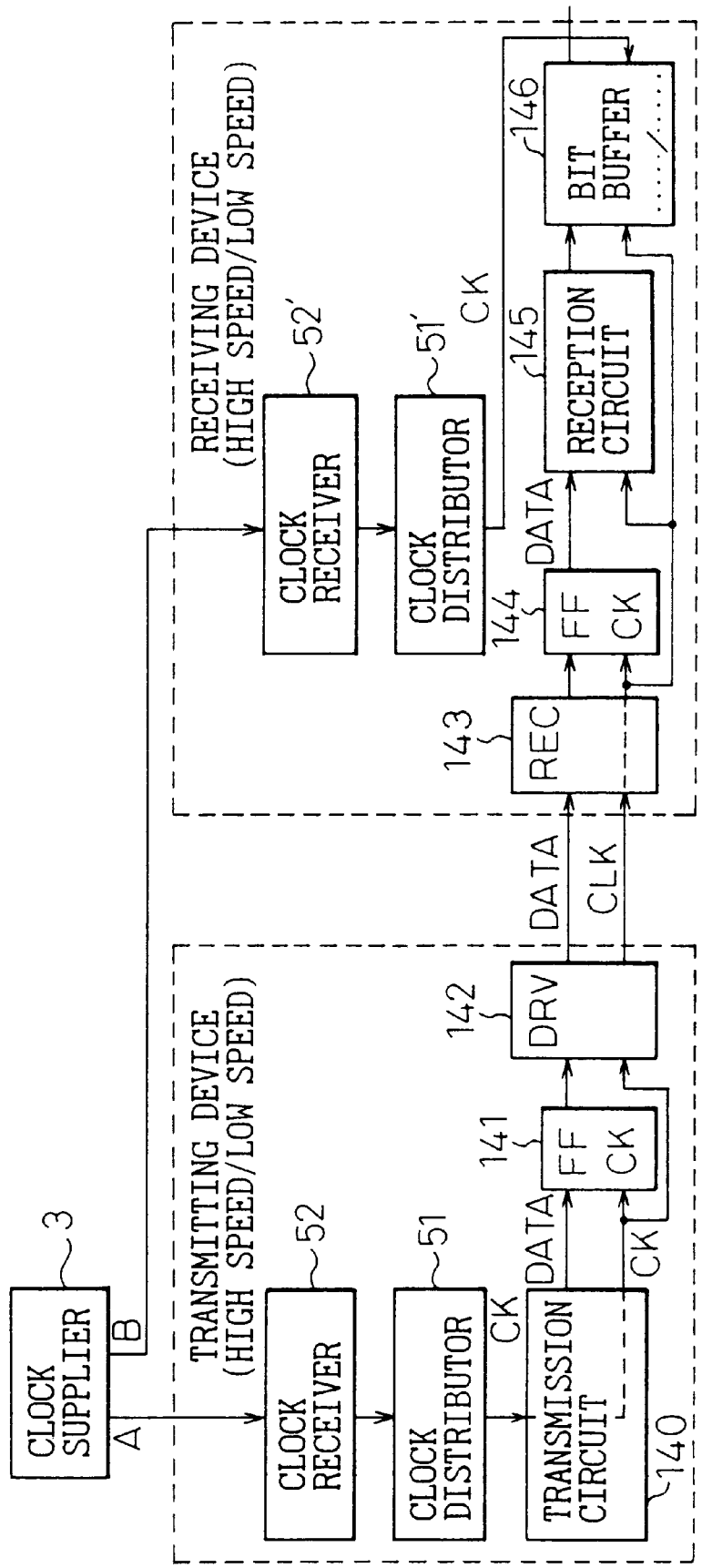
FIG. 15 shows an embodiment (3) of the present invention.

FIG. 15 shows the details of a clock supply system including the clock supplier 3 and clock unit 5 of FIG. 7, according to the embodiment (3) of the present invention.

The clock supplier 3 provides the low- and the high-speed devices 2 and 1 each with a reference clock signal used to synchronously transmit and receive data.

The clock supplier 3 provides any one of the high- and low-speed devices serving as a transmitter with a clock signal A. The clock signal A is passed through a clock receiver 52 and a clock distributor 51 to a transmission circuit 140. Data from the transmission circuit 140 is synchronized by a flip-flop circuit 141 based on the clock signal. The data and clock signal are transmitted through a driver 142 to the opposite party.

On the other hand, the other of the high- and low-speed devices serving as a receiver receives the data and clock signal through a receiver 143. A flip-flop circuit 144 synchronously samples the data based on the received clock signal, and the data is given to a reception circuit 145. The received data is read by a bit buffer 146 based on an internal clock signal B, which is supplied from the clock supplier 3 through a clock receiver 52' and a clock distributor 51'. In this way, the clock signal of the received data is switched to the clock signal B.

The present invention employs only the bit buffer 146 that switches a phase to another to change a clock signal to another. This arrangement eliminates a clock extractor, etc., used for an optical interface between devices.

Figure 16:
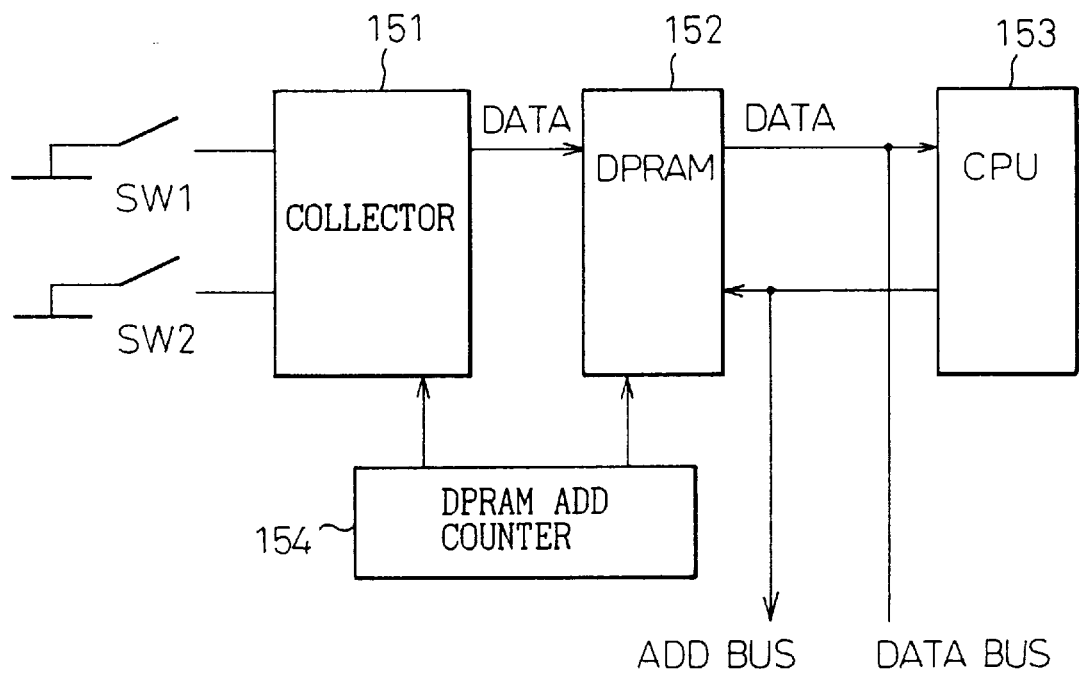
FIG. 16 shows an embodiment (4) of the present invention.

FIG. 16 shows an arrangement for changing device parameters according to the embodiment (4) of the present invention. This arrangement relates to a function of the control processor 71 of FIG. 7.

Control switches SW1 and SW2 are arranged on, for example, a front face of a package. A collector 151 collects set information and transfers it to a DPRAM 152. A DPRAM add counter 154 specifies an area of the DPRAM 152 where the set information is stored. The set information is asynchronously sent from the DPRAM 152 to a CPU 153.

This arrangement eliminates the need for an external controller as well as software for the external controller.

Figure 17:
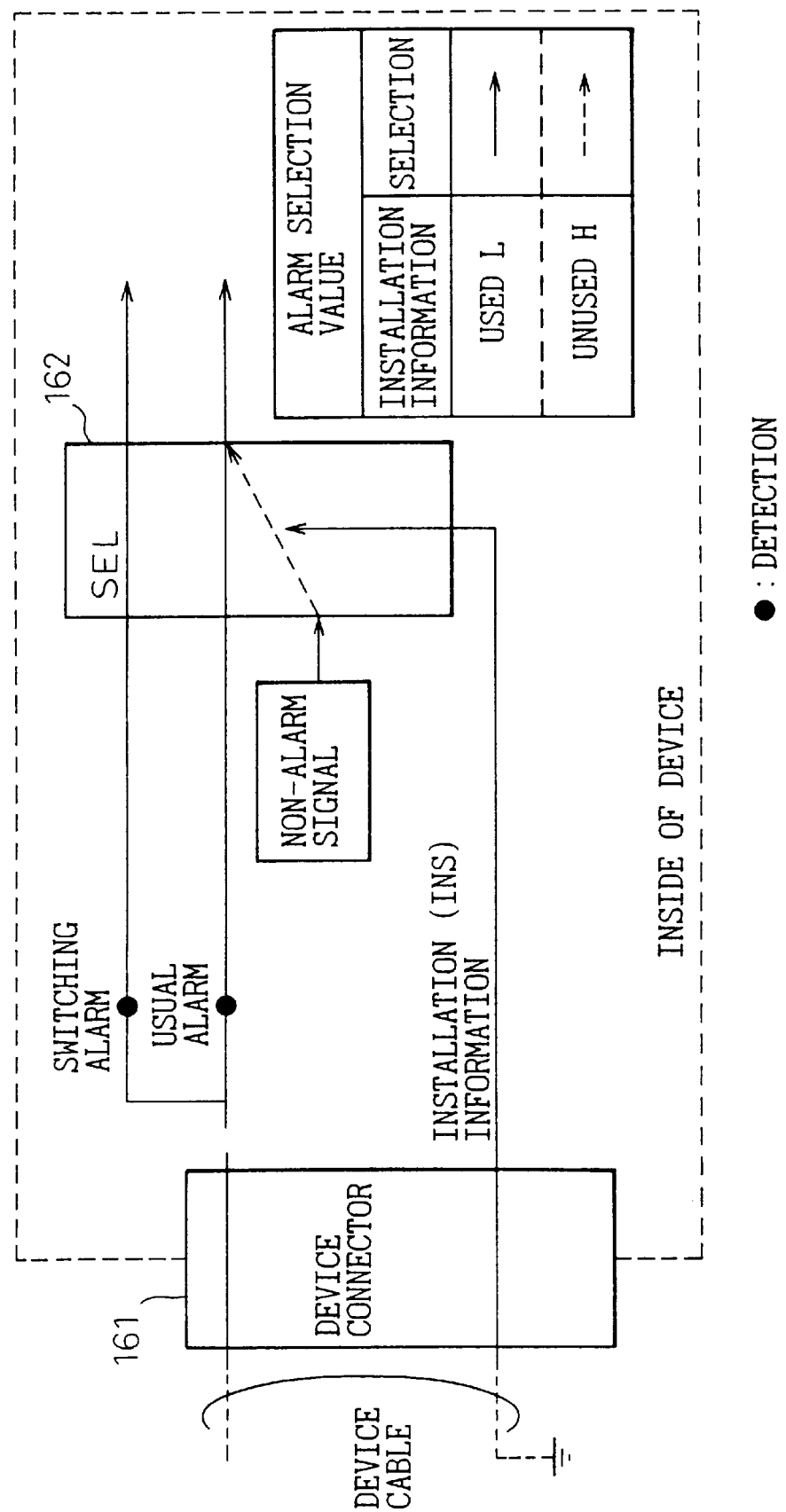
FIG. 17 shows an embodiment (5) of the present invention.

FIG. 17 shows an arrangement for preventing alarms from spreading to devices, according to the embodiment (5) of the present invention. This arrangement relates to a function of the electrical interface 15 of FIG. 7.

A device connector 161 connects devices to each other and has installation information to indicate whether or not the connector 161 is installed. This information is used to control alarms that spread. A selector 162 selects a non-alarm signal if the connect information shows that there is no connector, and usual alarms, provided through the connector 161 if the information shows that the connector 161, is present. A switching trigger alarm, however, is not passed through the selector 162 and is excluded from such a selection.

FIGS. 18 to 23 show a technique of prioritizing hardware alarms according to the embodiment (6) of the present invention. This embodiment relates to a function of the alarm processor 6 of FIG. 7.

Figure 18:
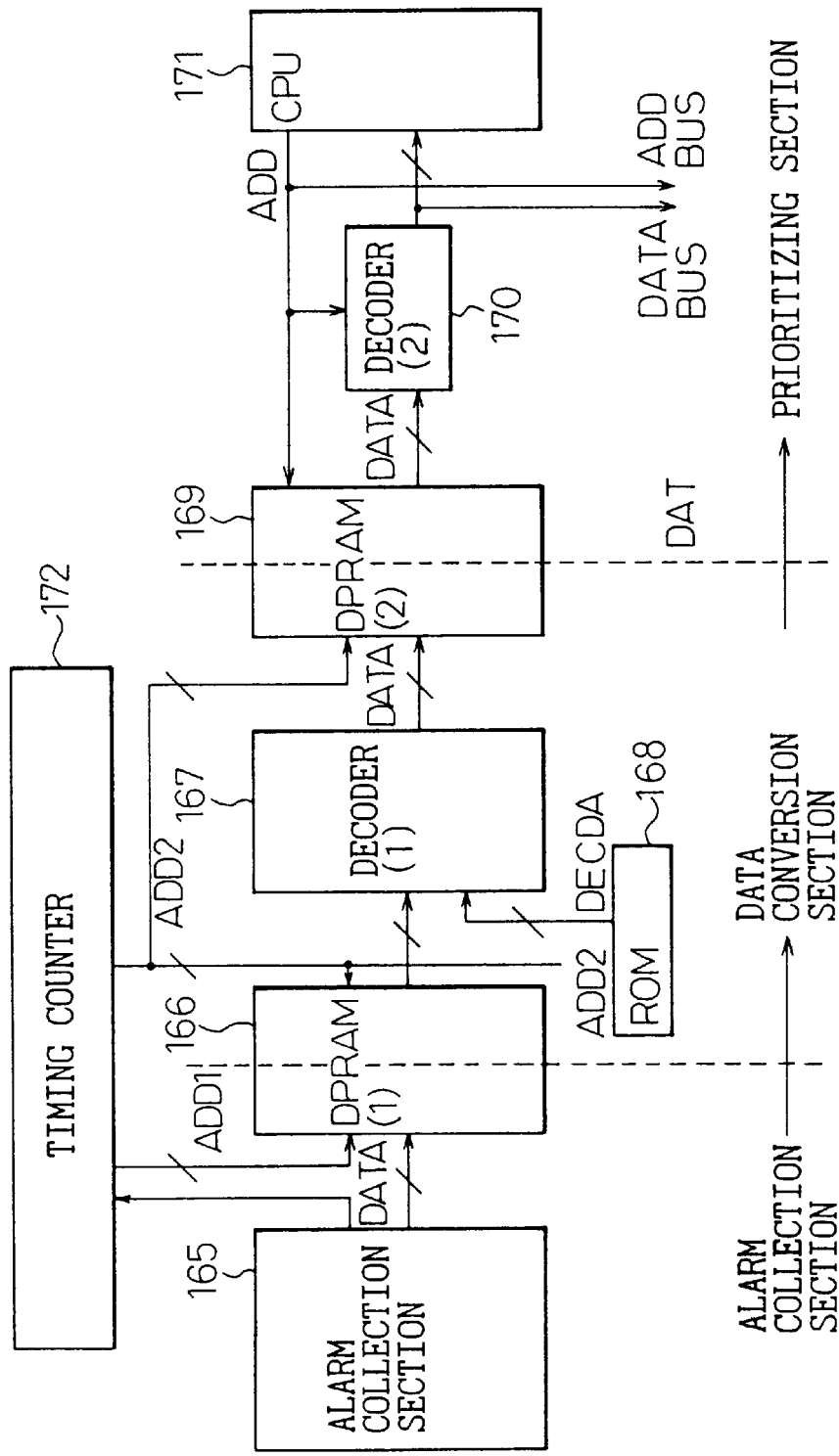
FIG. 18 shows an embodiment (6-1) of the present invention.

FIG. 18 is a block diagram showing alarm processing hardware. An alarm collector 165 collects a unit of alarms by polling and writes them into a DPRAM(1) 166. A data conversion section includes a decoder(1) 167 and a ROM 168 and converts the data stored in the DPRAM(1) 166 into a string of data, which is written into a DPRAM(2) 169.

The data stored in the DPRAM(2) 169 is processed by a prioritizing section to provide an alarm of the highest priority. A decoder(2) 170 sets "1" only for the alarm of the highest priority and provides a CPU 171 with a string of data. A timing counter 172 provides the alarm collection section and data conversion section with a timing signal.

Figure 19:
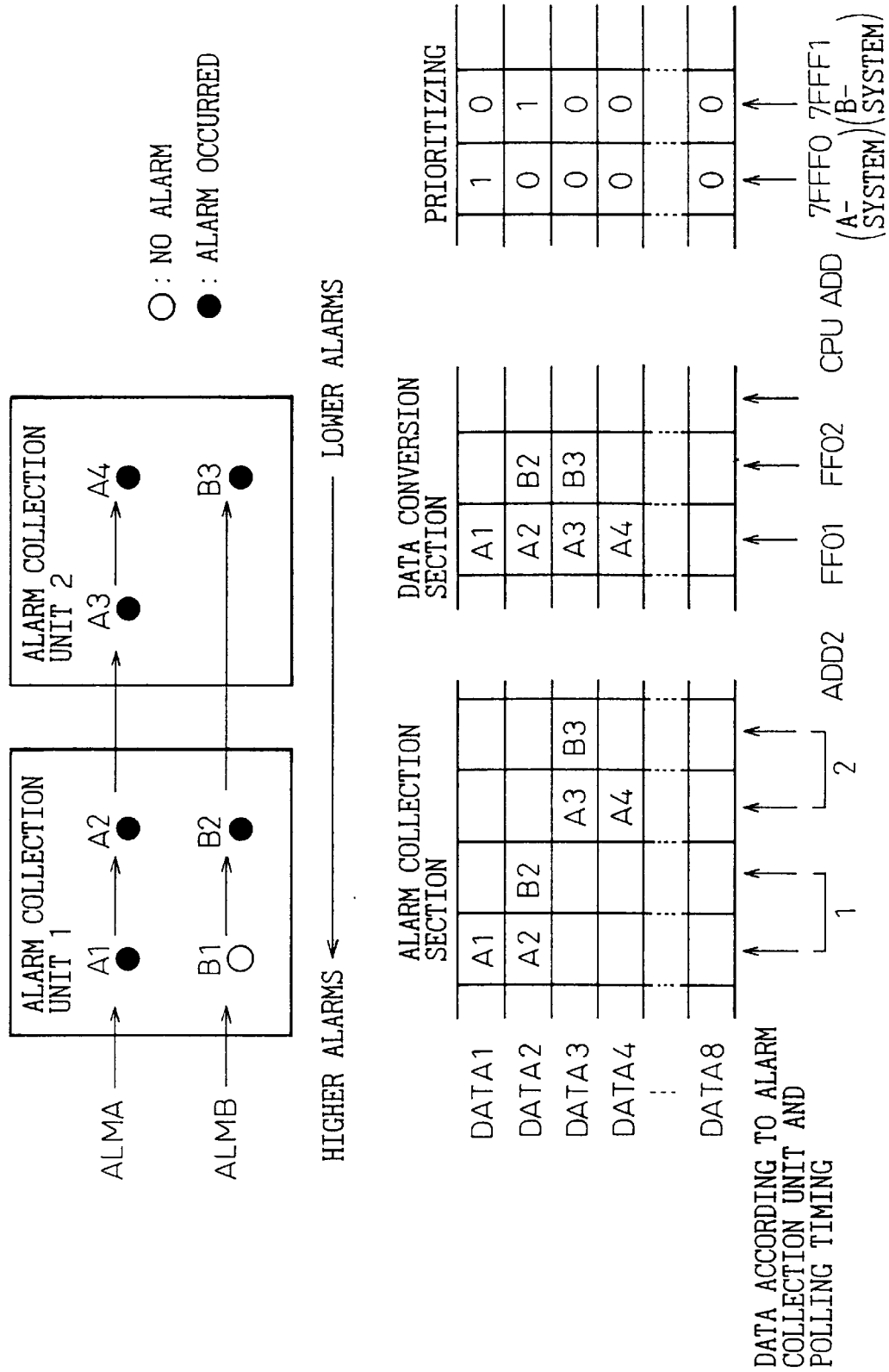
FIG. 19 shows an embodiment (6-2) of the present invention.

FIG. 19 explains a process of prioritizing alarms. If A-system alarms and B-system alarms occur, these alarms will affect alarm collection units 1 and 2 as shown in the figure. The alarm collection section of FIG. 18 carries out polling to collect these alarms and stores them as DATA1 to DATA8 in the DPRAM(1) 166.

The data conversion section of FIG. 18 collects the A-system alarms into an address of ADD2 FF01 and the B-system alarms into an address of ADD2 FF02. The prioritizing section of FIG. 18 sets "1" for an alarm of the highest priority in each of the A- and B-system alarms, i.e., A1 among the A-system alarms and B2 among the B-system alarms. In this way, prioritizing is carried out.

Figure 20:
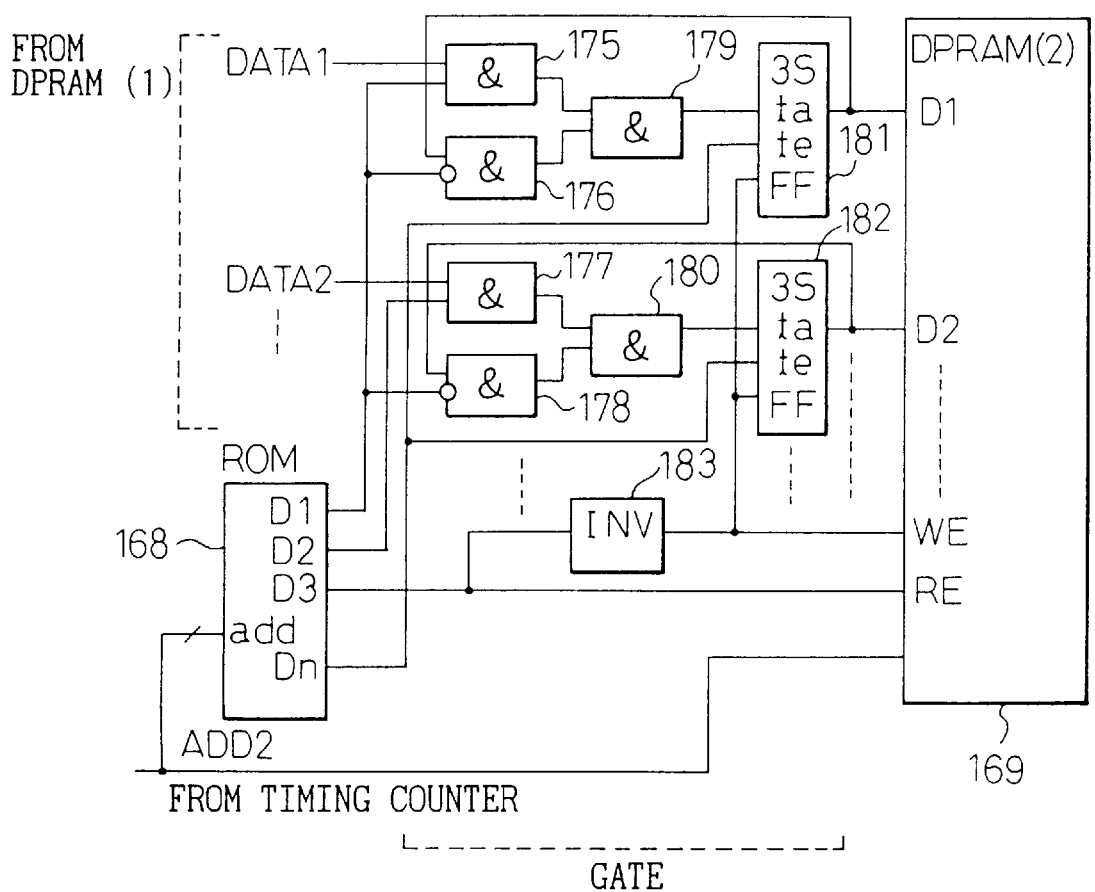
FIG. 20 shows an embodiment (6-3) of the present invention.
Figure 21:
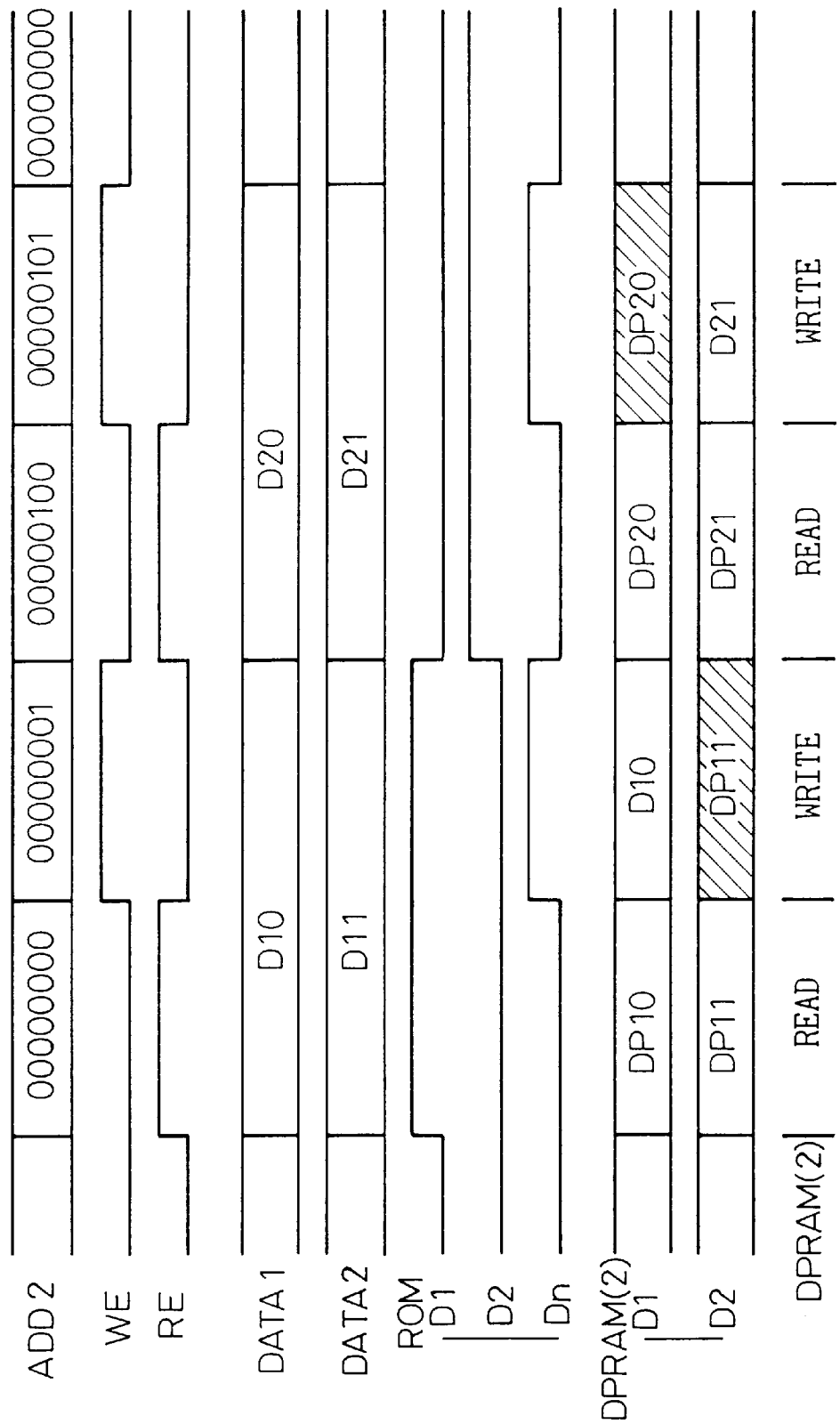
FIG. 21 shows an embodiment (6-4) of the present invention.

FIG. 20 shows the details of the data conversion section of FIG. 18, and FIG. 21 is a time chart showing the operation of the data conversion section.

In FIG. 20, the same parts as those of FIG. 18 are represented with like reference marks. The data conversion section of FIG. 20 has AND (&) circuits 175 to 180, 3-state-output flip-flop circuits 181 and 182, and an inverter circuit 183.

The timing counter 172 (FIG. 18) provides the DPRAM (1) 166, DPRAM(2) 169, and ROM 168 with an address ADD2. The ROM 168 generates timing based on the address ADD2, to transfer alarm data from the DPRAM(1) 166 to the DPRAM(2) 169.

In FIG. 21, hatched parts in D1 and D2 of the DPRAM(2) hold preceding data, and at any other write timing, alarms are written into the DPRAM(2). The mapping of the DPRAM(2) is made by the ROM.

Figure 22:
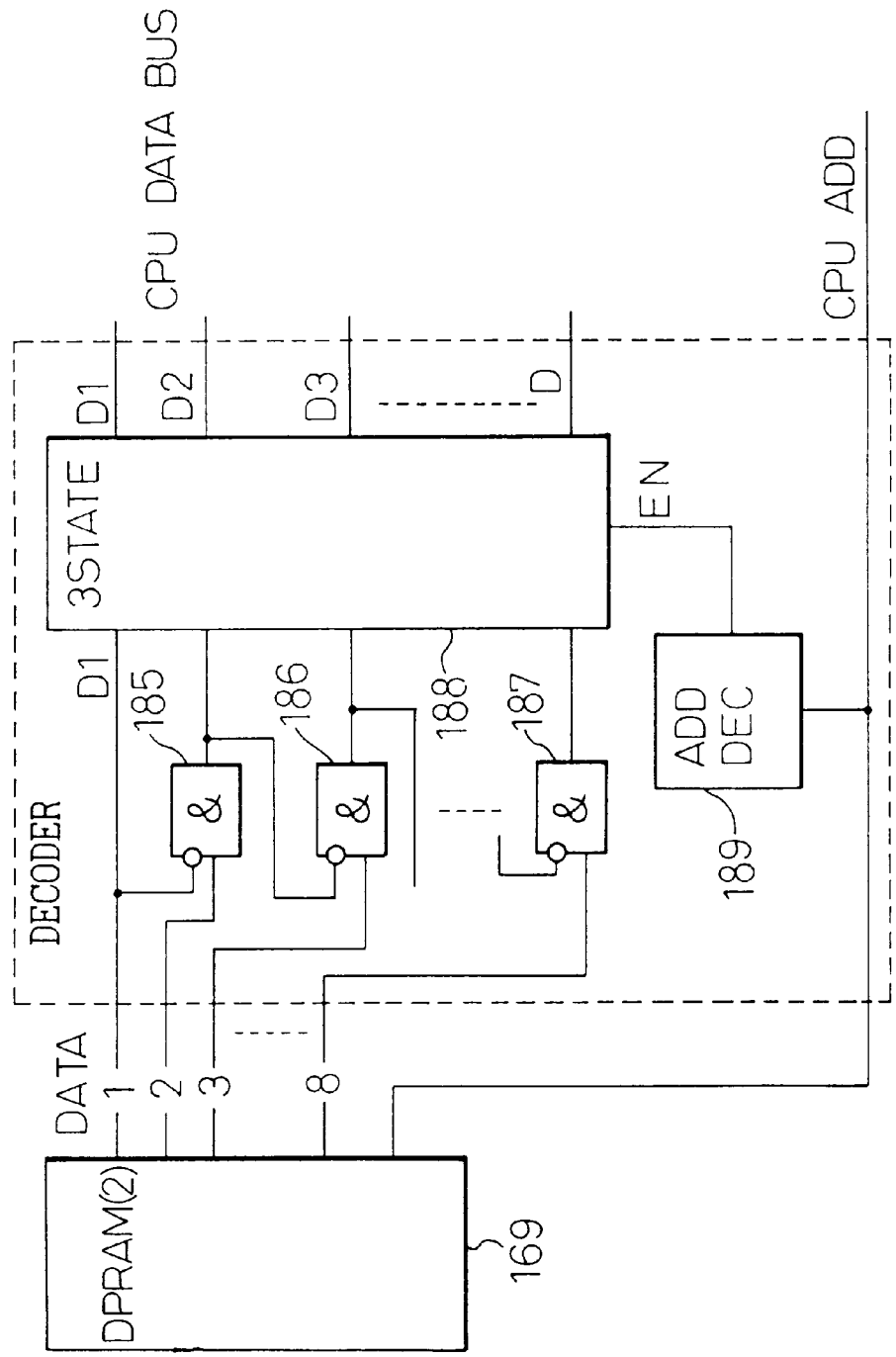
FIG. 22 shows an embodiment (6-5) of the present invention.
Figure 23:
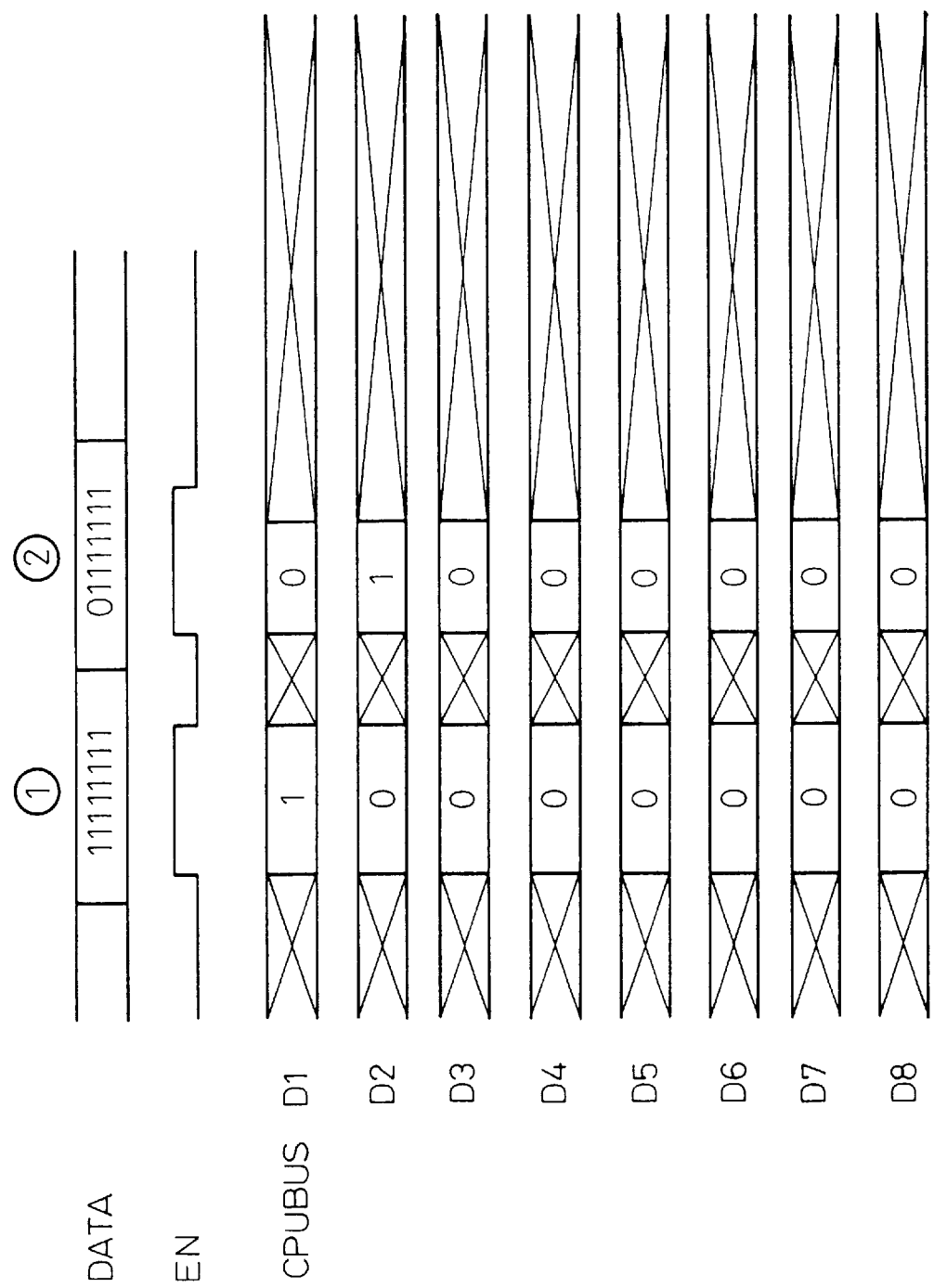
FIG. 23 shows an embodiment (6-6) of the present invention.

FIG. 22 shows the details of the prioritizing section of FIG. 18, and FIG. 23 is a time chart showing the operation of the prioritizing section.

The same parts as those of FIG. 18 are represented with like reference marks. The prioritizing section has AND (&) circuits 185 to 187, a 3-state-output flip-flop circuit 188, and an address decoder 189.

FIG. 23 explains a prioritizing process to be carried out when data in the DPRAM(2) 169 is 11111111 (data (1)) and 01111111 (data (2)). The leftmost bit D1 in each of the data (1) and data (2) is the most significant bit (MSB). The bit D1 of the data (1) is an alarm of the highest priority. The bit D2 of the data (2) is an alarm of the highest priority. Accordingly, these bits are each set to "1." These bits are read by the CPU 171 and are used for alarm processing. In this way, the present invention processes alarms by hardware at a high speed.

Figure 24:
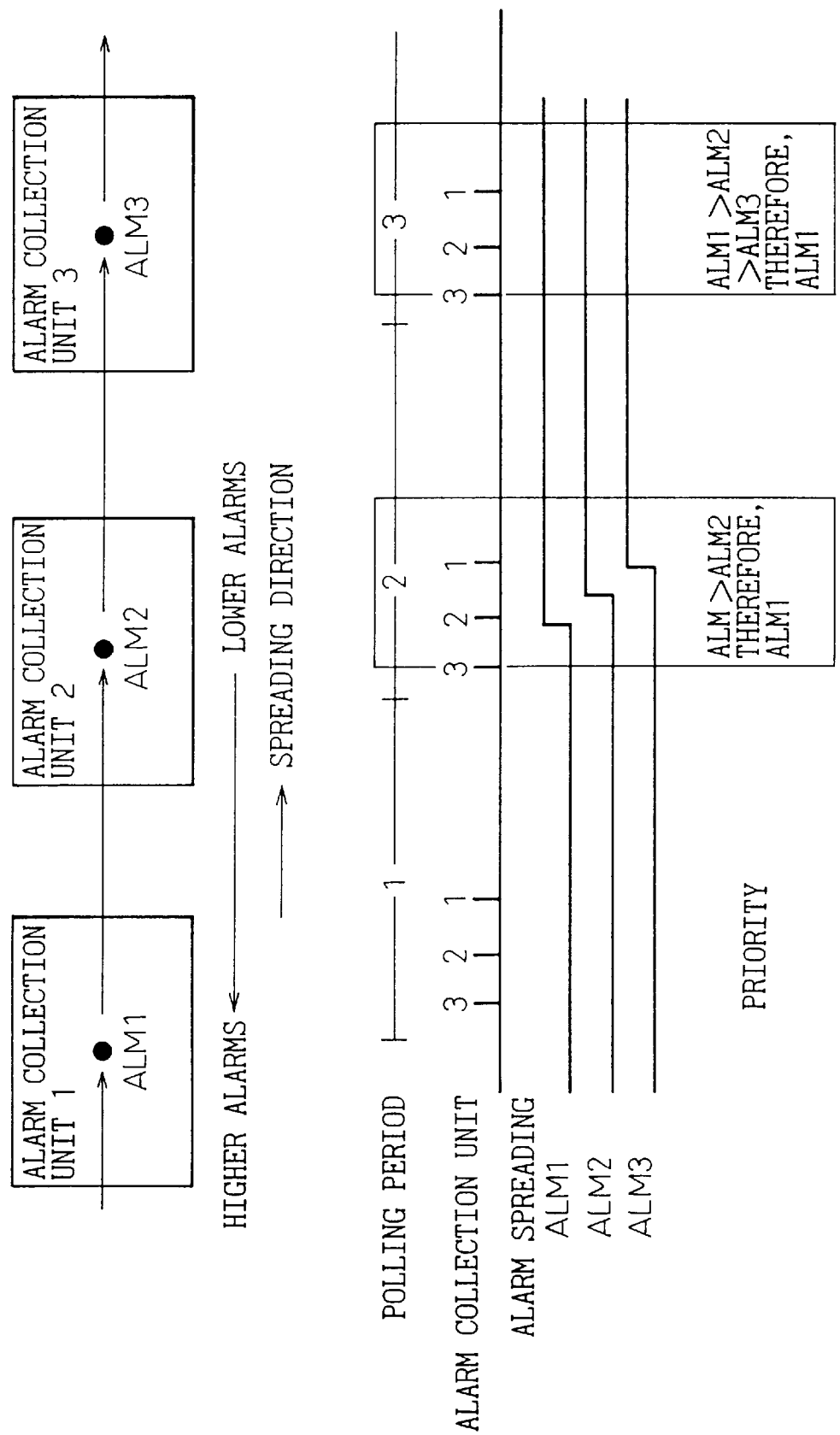
FIG. 24 shows an embodiment (7) of the present invention.

FIG. 24 shows a technique of collecting alarms in polling periods, according to the embodiment (7) of the present invention.

An alarm collection unit 1 has the highest priority, and an alarm collection unit 3 has the lowest priority. If alarms ALM1 to ALM3 occur in a polling period 2, they spread from high to low, and a higher alarm is first detected. Accordingly, the polling period 2 collects the alarms ALM1 and ALM2. Then, it is determined that the alarm ALM1 is an alarm origin. A polling period 3 also determines that the alarm ALM1 is an alarm origin. Consequently, the alarms are collected in order of priority. Namely no lower alarms are collected before the alarm ALM1, to avoid unnecessary alarms.

Figure 25:
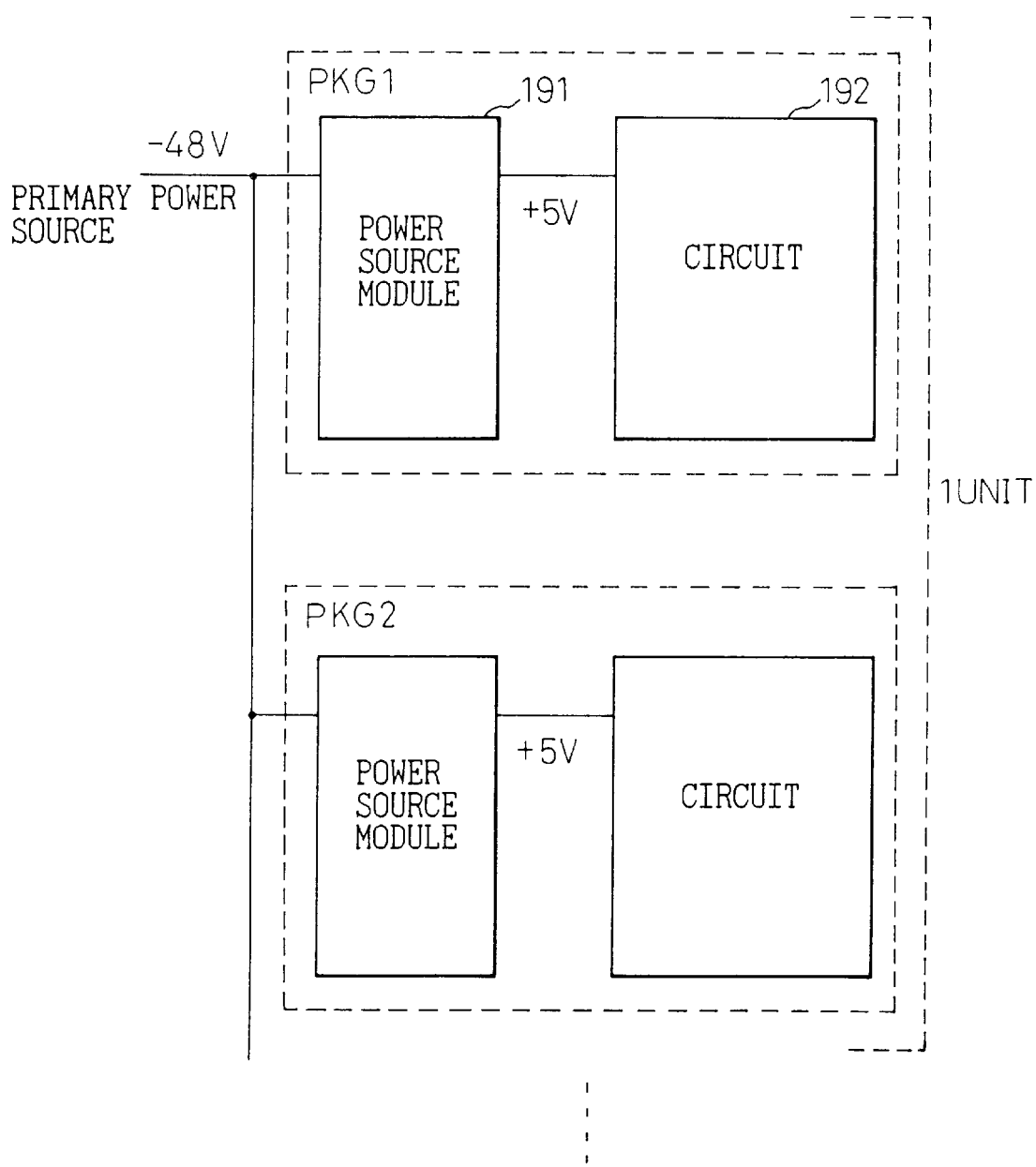
FIG. 25 shows an embodiment (8) of the present invention.

FIG. 25 shows scattered power sources according to the embodiment (8) of the present invention.

A power source module 191 is mounted on each package. A circuit 192 is specific to each package.

A plurality of packages PKG1, PKG, 2, and the like are installed in a device unit. Since each package is provided with a power source module 101, there is no need of preparing power source packages for the device unit. This saves space in the device unit and expands the degree of freedom of designing for heat radiation and a hierarchical arrangement of packages in the device unit.

Figure 26A:
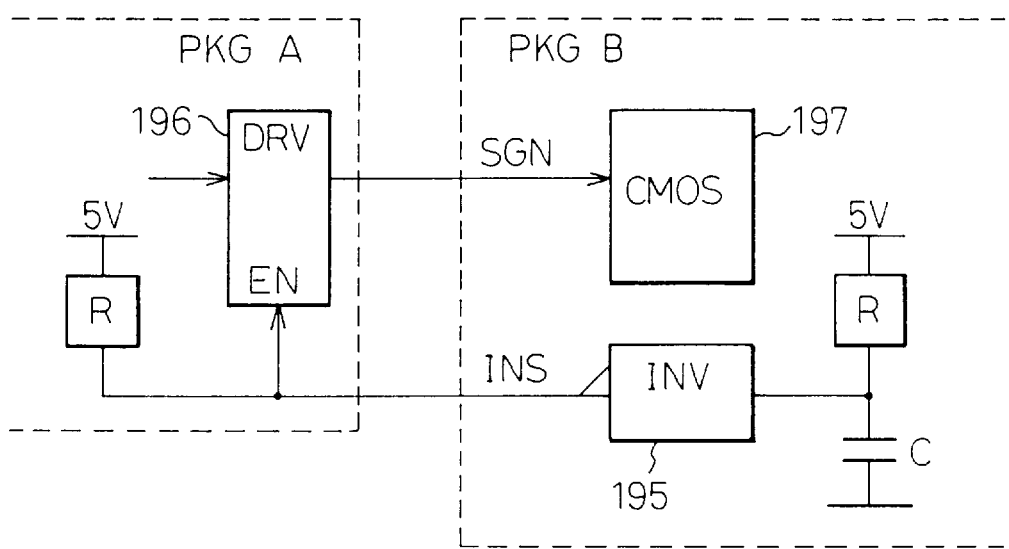
FIGS. 26A and 26B show an embodiment (9) of the present invention.
Figure 26B:
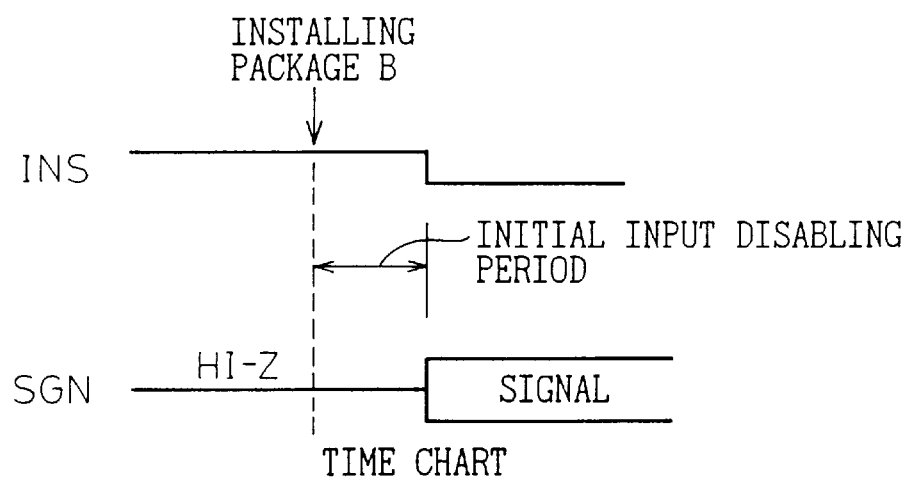

FIGS. 26A and 26B show a technique of employing installation information that indicates whether or not a package is installed, according to the embodiment (9) of the present invention.

The installation information is used to prevent a latch-up phenomenon of a CMOS circuit that is a part of an interface to which the package in question is connected. In FIGS. 26A and 26B, FIG. 26A is a block diagram showing packages A and B connected to each other, and FIG. 26B is a time chart showing the installation information.

When the package B is installed, a time constant circuit consisting of a resistor R and a capacitor C delays an increase in a source voltage. An inverter circuit 195 inverts the output of the time constant circuit. The output of the inverter circuit 195 is supplied as the installation information to the package A. In response to the information, the package A once disables a driver 196. As a result, the output of the package A is masked for a given period after the installation of the package B as shown in FIG. 26B. Then, an input to the CMOS circuit 197 of the package B becomes high impedance to prevent the latch-up phenomenon of the CMOS circuit 197.

FIG. 27 shows a technique of narrowing the pulse width of a frame pulse signal with respect to the pulse width of a system clock signal, to prevent a pulse of the frame pulse signal from covering two pulses of the clock signal, according to the embodiment (10) of the present invention.

A frame pulse signal OUT FP and a clock signal OUT CLK are signals to be transmitted. A frame pulse signal IN FP and a frame pulse signal IN FP2 are received signals.

The frame pulse signal OUT FP is of 25 MHz. Due to frequency components and wiring capacitance, the frame pulse signal IN FP has a slope as indicated with a point A and a hatched area. As a result, the frame pulse signal IN PP covers two pulses of the clock signal IN CLK. To solve this problem, the frequency of the frame pulse signal is doubled (50 MHz) to form the frame pulse signal IN FP2. The frequency multiplication of the frame pulse signal is not limited to double. Any multiplication is acceptable if it sufficiently narrows the pulse width of the frame pulse signal compared to the pulse width of the clock signal.

As explained above, the SDH apparatus of the present invention properly uses integrated common parts in the interface between the low- and high-speed devices, to greatly reduce the scale and power consumption of the apparatus.

The SDH apparatus is capable of controlling itself without an external controller and processing alarms at a high speed.

The SDH apparatus employs circuits that operate correctly and have easily dividable functions.

Further effects of the present invention are as follows:

The low- and high-speed devices of the SDH apparatus are connected to each other through an electrical interface instead of an optical interface, to eliminate the need for some functions such as timing extraction, scrambling, descrambling, and optical-to-electrical or electrical-to-optical conversion.

The transmission rate of the electrical interface is half (25.92 MHz) of a data transmission rate, to enable the use of CMOSs and TTLs instead of ECLs. This helps reduce the power consumption and improve the integration of the SDH apparatus.

The interface between the low- and high-speed devices may be an STM-0 interface to realize easy frame conversion.

The high-speed device has the low-speed electrical interface portion to absorb the frame phase of a signal transferred from the low-speed device. This helps reduce the size of the high-speed multiplexer of the high-speed device and easily convert the frame phase into an internal frame phase.

The present invention detects errors and input disconnection without terminating most frames of an STM-0 signal at the electrical interface, changes the frames into internal frames, and transfers the STM-0 signal to the high-speed multiplexer. This results in reducing the size of the high-speed multiplexer.

In the downward direction from the high-speed device to the low-speed device, the present invention completes signal processing by simply checking bit errors at the high-speed demultiplexer. This eliminates the need for terminator circuits.

The STM-0 interface synchronizes a frame according to a frame pulse signal without using a frame pattern. This prevents false synchronization, eliminates the need for scrambling and descrambling circuits, and reduces the scale of the high-speed multiplexer and demultiplexer.

The SDH apparatus employs synchronous clock signals to operate the devices. This eliminates the need for stuffing and clock switching circuits.

The present invention changes the internal parameters of the devices with the use of switches, to reduce software and hardware for the purpose.

The present invention uses installation information about unused circuits, to mask alarms sent from the unused circuits. This helps quickly spot a fault during maintenance. The present invention does not mask a circuit switching alarm. This prevents circuit disconnection from being left unnoticed.

The hardware decoding process of the present invention prioritizes alarms at a high speed. Alarms are passed to software through registers that involve parallel-to-serial conversion. This reduces the number of alarm processes. The registers are mapped by ROM (read only memory). This reduces the number of hardware decoding tasks.

The mapping by ROM also reduces the size of the decoding hardware. Reducing the size of the decoding hardware is important because a large number of changes are involved when a change or an error occurs in the prioritizing of alarms.

The present invention starts to collect alarms from a last one among spreading alarms. This improves the efficiency of alarm prioritization.

The present invention installs a power source circuit in each package, to save space in each device of the SDH apparatus.

In the SDH apparatus, a package on the receiving side sends installation information to a package on the transmitting side. When the package on the receiving side is installed, the package on the transmitting side makes its output level low or high impedance during an initial prohibition period, thereby preventing the breakage of the package on the receiving side due to the latch-up phenomenon of a reception buffer.

The present invention narrows the pulse width of a frame pulse signal, to prevent each pulse of the frame pulse signal from covering two pulses of a high-speed clock signal.

What is claimed is:

1. A high-speed synchronous multiplexing apparatus having a first communication device connected to and accommodating a low-speed digital circuit and a second communication device connected to a high-speed synchronous multiplexing circuit, comprising:

clock supply means for supplying a reference clock signal, which sets a communication rate, to each of the first and second communication devices;

alarm processing means for separately detecting faults from the first communication device and second communication devices and performing respective alarm proceedings;

a first communication device for receiving data from the low-speed digital circuit, preparing serial low-speed data from the received data in synchronization with the reference clock signal, and transmitting the serial low-speed data with a frame signal to the second communication device via separated data and frame signal lines, and for receiving serial low-speed data with a frame signal from the second communication device and sending the received data to the low-speed digital circuit; and the second communication device for receiving the serial low-speed data with a frame signal from the first communication device and sending the received data as a high-speed synchronous multiplexed signal to the high-speed synchronous multiplexing circuit, and for receiving a high-speed synchronous multiplexed signal from the high-speed synchronous multiplexing circuit, preparing serial low-speed data from the high-speed synchronous multiplexed signal in synchronization with the reference clock signal, and transmitting the low-speed serial data with a frame signal to the first communication device via separated data and frame signal lines.

2. A high-speed synchronous multiplexing apparatus having a first communication device connected to and accommodating a low-speed digital circuit and a second communication device connected to a high-speed synchronous multiplexing circuit, comprising:

clock supply means for supplying a reference clock signal, which sets a communication rate, to each of the first and second communication devices;

alarm processing means for separating faults in the first communication device from those in the second communication devices;

a first communication device receiving data from the low-speed digital circuit, preparing serial data from the received data in synchronization with the reference clock signal, and transmitting the serial data with a frame signal to the second communication device, so that the second communication device prepares a high-speed synchronous multiplexed signal from the serial data and frame signal and sends the high-speed synchronous multiplexed signal to the high-speed synchronous multiplexing circuit;

the second communication device receiving a high-speed synchronous multiplexed signal from the high-speed synchronous multiplexing circuit, preparing serial data from the high-speed synchronous multiplexed signal in synchronization with the reference clock signal, and transmitting the serial data with a frame signal to the first communication device, so that the first communication device prepares a data signal from the serial data and frame signal and sends the data signal to the low-speed digital circuit; and the first communication device sending fault information to the alarm processing means, wherein the first communication device includes:

low-speed termination means for terminating the low-speed digital circuit;

data assembling/transmitting means for preparing serial data from data provided by the low-speed termination means and transmitting the serial data to the second communication device; and data receiving/decomposing means for receiving serial data from the second communication device, preparing a data signal for the low-speed digital circuit from the serial data, and transferring the data signal to the low-speed termination means.

3. The high-speed synchronous multiplexing apparatus of claim 2, wherein the data assembling/transmitting means transmits the data from the low-speed termination means, as it is, as the serial data.

4. The high-speed synchronous multiplexing apparatus of claim 2, wherein the data assembling/transmitting means converts the data from the low-speed termination means into a VC/VT signal and transmits the VC/VT signal as the serial data.

5. The high-speed synchronous multiplexing apparatus of claim 4, wherein the VC/VT signal is provided with an STM/STS header format in which only a pointer and a fault notification byte are used, the fault notification byte being used to send fault information to the alarm processing means.

6. The high-speed synchronous multiplexing apparatus of claim 2, wherein the data receiving/decomposing means provides the low-speed termination means with the serial data as it is.

7. The high-speed synchronous multiplexing apparatus of claim 2, wherein the data receiving/decomposing means receives a VC/VT signal as the serial data, decomposes the VC/VT signal, and provides the low-speed termination means with the decomposed signal.

8. The high-speed synchronous multiplexing apparatus of claim 6, wherein the VC/VT signal is provided with an STM/STS header format in which only a pointer and a fault notification byte are used.

9. The high-speed synchronous multiplexing apparatus of claim 2, wherein the data receiving/decomposing means receives an STM/STS signal as the serial data, decomposes the STM/STS signal, and provides the low-speed termination means with the decomposed signal.

10. A high-speed synchronous multiplexing apparatus having a first communication device connected to and accommodating a low-speed digital circuit and a second communication device connected to a high-speed synchronous multiplexing circuit, comprising:

clock supply means for supplying a reference clock signal, which sets a communication rate, to each of the first and second communication devices;

alarm processing means for separating faults in the first communication device from those in the second communication devices;

a first communication device receiving data from the low-speed digital circuit, preparing serial data from the received data in synchronization with the reference clock signal, and transmitting the serial data with a frame signal to the second communication device, so that the second communication device prepares a high-speed synchronous multiplexed signal from the serial data and frame signal and sends the high-speed synchronous multiplexed signal to the high-speed synchronous multiplexing circuit;

the second communication device receiving a high-speed synchronous multiplexed signal from the high-speed synchronous multiplexing circuit, preparing serial data from the high-speed synchronous multiplexed signal in synchronization with the reference clock signal, and transmitting the serial data with a frame signal to the first communication device, so that the first communication device prepares a data signal from the serial data and frame signal and sends the data signal to the low-speed digital circuit; and the first communication device sending fault information to the alarm processing means, wherein the second communication device includes;

STM/STS multiplexing means for receiving the serial data from the first communication device and multiplexing the received data into an STM/STS signal;

high-speed multiplexing means for multiplexing such STM/STS signals into a multiplexed STM/STS signal and sending the multiplexed STM/STS signal to the high-speed synchronous multiplexing circuit;

a high-speed demultiplexing means for receiving a multiplexed STM/STS signal from the high-speed synchronous multiplexing circuit and demultiplexing the received signal into STM/STS signals; and STM/STS passing/separating means for passing or separating the STM/STS signals and transferring the passed or separated one as serial data to the first communication device.

11. The high-speed synchronous multiplexing apparatus of claim 10, wherein the STM/STS multiplexing means receives data from the low-speed termination means as it is as the serial data and multiplexes the received data into an STM/STS signal.

12. The high-speed synchronous multiplexing apparatus of claim 10, wherein the STM/STS multiplexing means receives a VC/VT signal as the serial data and multiplexes the VC/VT signal into an STM/STS signal.

13. The high-speed synchronous multiplexing apparatus of claim 12, wherein the VC/VT signal is provided with an STM/STS header format in which only a pointer and a fault notification byte are effective, the fault notification byte being used to send faulty information to the alarm processing means.

14. The high-speed synchronous multiplexing apparatus of claim 10, wherein the STM/STS passing/separating means transmits data to the low-speed termination means, as it is, as the serial data.

15. The high-speed synchronous multiplexing apparatus of claim 10, wherein the STM/STS passing/separating means transmits a VC/VT signal as the serial data.

16. The high-speed synchronous multiplexing apparatus of claim 15, wherein the VC/VT signal is provided with an STM/STS header format in which only a pointer and a fault notification byte are used.

17. The high-speed synchronous multiplexing apparatus of claim 10, wherein the STM/STS passing/separating means transmits an STM/STS signal as the serial data.

18. A high-speed synchronous multiplexing apparatus having a first communication device connected to and accommodating a low-speed digital circuit and a second communication device connected to a high-speed synchronous multiplexing circuit, comprising:

clock supply means for supplying a reference clock signal, which sets a communication rate, to each of the first and second communication devices;

alarm processing means for separately detecting faults from the first communication device and second communication devices and performing respective alarm proceedings;

a first communication device for receiving data from the low-speed digital circuit, preparing serial low-speed data from the received data in synchronization with the reference clock signal, and transmitting the serial low-speed data with a frame signal to the second communication device via separated data and frame signal lines, and for receiving serial low-speed data with a frame signal from the second communication device and sending the received data to the low-speed digital circuit; and the second communication device for receiving the serial low-speed data with a frame signal from the first communication device and sending the received data as a high-speed synchronous multiplexed signal to the high-speed synchronous multiplexing circuit, and for receiving a high-speed synchronous multiplexed signal from the high-speed synchronous multiplexing circuit, preparing serial low-speed data from the high-speed synchronous multiplexed signal in synchronization with the reference clock signal, and transmitting the low-speed serial data with a frame signal to the first communication device via separated data and frame signal lines; and a low-speed device for converting an STM-0/STS-1 signal composed of parallel data and an STM-0/STS-1 signal composed of serial data from one into another, and a high-speed device for converting an STM-0/STS-1 signal composed of serial data and a high-order STM/STS signal from one into another, and an electric STM-0/STS-1 interface for connecting the low-speed device and the high-speed device to each other.

19. The high-speed synchronous multiplexing apparatus of claim 18, wherein the electrical interface employs two electrical signals formed by dividing an STM-0/STS-1 signal.

20. The high-speed synchronous multiplexing apparatus of claim 18, wherein the high-speed device employs an STM-0/STS-1 interface for STM-0/STS-1 signals.

21. The high-speed synchronous multiplexing apparatus of claim 18, wherein the high- and low-speed devices each operate on a clock signal provided by clock supply means.

22. The high-speed synchronous multiplexing apparatus of claim 21, wherein the pulse width of a frame pulse signal used to synchronize an input signal is made narrower than the pulse width of a clock signal of the input signal.

23. The high-speed synchronous multiplexing apparatus of claim 20, wherein the STM-0/STS-1 interface of the high-speed device switches the frame phase of an upward signal coming from the low-speed device to an internal frame phase.

24. The high-speed synchronous multiplexing apparatus of claim 23, wherein STM-0/STS-1 signals each having such switched internal frame phase are simply multiplexed into a high-order STM/STS signal.

25. The high-speed synchronous multiplexing apparatus of claim 23, wherein the STM-0/STS-1 interface detects a frame according to a frame pulse signal.

26. The high-speed synchronous multiplexing apparatus of claim 20, wherein the STM-0/STS-1 interface of the high-speed device detects disconnection and an error in a downward signal oriented toward the low-speed device and transmits the downward signal to the low-speed device, and the low-speed device uses a frame pulse signal transmitted from the high-speed device, to synchronize the downward signal.

27. The high-speed synchronous multiplexing apparatus of claim 18, wherein each of packages that form the high-speed synchronous multiplexing apparatus is provided with a switch to change internal parameters thereof.

28. The high-speed synchronous multiplexing apparatus of claim 18, wherein a device connector of the high-speed synchronous multiplexing apparatus is provided with installation information to indicate whether or not the connector is installed, the installation information being used to mask alarm information so as not to be sent to other devices if the connector is not installed in the corresponding device.

29. The high-speed synchronous multiplexing apparatus of claim 28, wherein a circuit switching trigger is excluded from the masking operation to be carried out according to the installation information.

30. The high-speed synchronous multiplexing apparatus of claim 18, wherein a hardware decoding process realizes a prioritizing process that collects alarms in the SDH apparatus in spreading order, encodes the collected alarms, decodes a string of the codes, and detects an alarm having the highest priority among the alarms.

31. The high-speed synchronous multiplexing apparatus of claim 30, wherein a result of the prioritizing process is sent as serial data to a processing device through registers.

32. The high-speed synchronous multiplexing apparatus of claim 30, wherein the prioritizing process is realized by a decoding operation carried out with the use of mapping information stored in a ROM.

33. The high-speed synchronous multiplexing apparatus of claim 30 wherein alarms in the high-speed synchronous multiplexing apparatus are collected from a spreading end to higher ones.

34. The high-speed synchronous multiplexing apparatus of claim 18, wherein each of packages that form the high-speed synchronous multiplexing apparatus is provided with a power source.

35. The high-speed synchronous multiplexing apparatus of claim 18, wherein each of packages that form the high-speed synchronous multiplexing apparatus is provided with installation information to indicate whether or not the package is installed, a rise of an input voltage from a preceding package being delayed according to the installation information.

* * * * *